US008536833B2

(12) United States Patent
Ohnuki

(10) Patent No.: US 8,536,833 B2
(45) Date of Patent: Sep. 17, 2013

(54) POWER SUPPLYING APPARATUS

(75) Inventor: Yasumichi Ohnuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 653 days.

(21) Appl. No.: 12/721,501

(22) Filed: Mar. 10, 2010

(65) Prior Publication Data

US 2010/0231167 A1 Sep. 16, 2010

(30) Foreign Application Priority Data

Mar. 11, 2009 (JP) ................................. 2009-057619
Sep. 17, 2009 (JP) ................................. 2009-215991

(51) Int. Cl.
*H02J 7/00* (2006.01)

(52) U.S. Cl.
USPC ........................................................ 320/119

(58) Field of Classification Search
USPC ........................................................ 320/119
See application file for complete search history.

(56) References Cited

U.S. PATENT DOCUMENTS

| 5,594,320 | A | 1/1997 | Pacholok et al. | |
| 5,841,240 | A * | 11/1998 | Beij et al. .................. | 315/219 |
| 6,538,414 | B1 | 3/2003 | Tsuruga et al. | |
| 7,812,572 | B2 * | 10/2010 | Bolz et al. .................. | 320/166 |
| 2004/0037100 | A1 * | 2/2004 | Orr et al. .................. | 363/131 |
| 2004/0135544 | A1 | 7/2004 | King et al. | |
| 2008/0211456 | A1 | 9/2008 | Bolz et al. | |
| 2009/0273321 | A1 * | 11/2009 | Gotzenberger et al. ....... | 320/166 |

FOREIGN PATENT DOCUMENTS

| DE | 10 2006 028 503 A1 | 12/2007 |
| GB | 2 451 138 A | 1/2009 |
| JP | 4-95089 A | 3/1992 |
| JP | 4-95089 B2 | 3/1992 |
| JP | 8-140204 A | 5/1996 |
| JP | 2007-166691 A | 6/2007 |
| JP | 2007-322524 | 12/2007 |
| JP | 2008-92717 A | 4/2008 |

OTHER PUBLICATIONS

Schmidt, Heribert, et al., "The Charge Equalizer—A New System to Extend Battery Lifetime in Photovoltaic Systems, U.P.S. And Electric Vehicles", International Telecommunications Energy Conference, Sep. 27, 1993, pp. 146-151, vol. 2.

* cited by examiner

*Primary Examiner* — Ramy Ramadan
(74) *Attorney, Agent, or Firm* — Arent Fox LLP

(57) ABSTRACT

A power supplying apparatus for supplying power to a plurality of loads has been needed. Therefore, a power supplying apparatus for supplying power to a plurality of loads, including: a rectifying circuit connected to each of the plurality of loads; an AC circuit to sequentially connect between the rectifying circuits; and an AC generating circuit to apply AC voltage to the AC circuit, in which the AC circuit includes a capacitor and an inductor connected in series is provided.

17 Claims, 39 Drawing Sheets

POWER SUPPLYING APPARATUS

CROSS REFERENCE TO RELATED APPLICATION

The present application claims benefit of the tiling dates of Japanese Patent Applications Nos. 2009-057619 filed on Mar. 11, 2009, and 2009-215991 filed on Sep. 17, 2009, which are incorporated herein by reference.

BACKGROUND OF THE INVENTION

1. Field of the Invention

The present invention relates to a power supplying apparatus for supplying power to a plurality of loads such as a plurality of cell modules, a plurality of cell controlling modules, and a plurality of voltage measuring apparatuses, etc.

2. Description of the Related Art

In recent years, in order to achieve environmental conservation, low noise, and low fuel consumption, electric vehicles such as an electric car, a fuel-cell car, and a hybrid car are in practical use, and these electric vehicles are equipped with high-voltage batteries for driving traction motors. Generally, the high-voltage battery used for the above purpose is achieved by connecting a plurality of cell modules in series. Because a current passing through the traction motor is lowered by heightening voltage of the battery as described above, a mass of an electric wire and a heat loss caused by power consumption can be lowered compared to a low-voltage and same-output traction motor.

Incidentally, in a plurality of cell modules connected in series (battery cell), a charged amount of one battery cell will become different from that of other battery cell by degrees due to a deviation of a characteristic of the battery cell (for example, a deviation of an internal impedance of the battery cell) after charging/discharging are repeated. Therefore, when any one of battery cells arrives at an upper limit of the charged amount, a charging operation should be stopped even if other battery cells are not full charged. Also, when any one of the battery cells arrives at a lower limit of the charged amount (discharge cut off voltage), discharging operation should be stopped even if other cells do not arrive at the discharge cut off voltage. That is, as a whole group of cells connected in series (assembled battery), because any one of the battery cells arrives at the upper or lower limit of the charged amount at early stage, available charged amount is substantially reduced.

For this reason, in order to resolve the above problem, a charging apparatus in which each electrode of a capacitor cell (battery cell) is isolated from a cycle power source via a capacitor, this capacitor is charged by voltage corresponding to a potential difference between a potential of each electrode and an output voltage of the cycle power source, thereby charging the battery cell (for example, see JP 2008-092717 A). This charging apparatus includes a condenser (high-voltage battery) in which a plurality of capacitor cells are connected in series, and an electrode of any one of capacitor cells is defined as a reference potential point; a plurality of capacitors connected in series in which a voltage of one end is fixed via a rectifier between one electrode of each capacitor cell and another electrode of the plurality of capacitor cells; and a cycle power source which is connected to a reference potential point of a condenser which is connected between any other end of the plurality of capacitor connected in series and a reference potential point of the condenser, and generates a repeated signal. With such configuration, because a charging current is allowed to pass from a battery cell having high charging voltage to a battery cell having low charging voltage, deviation of voltage of battery cell is decreased, resulting in an increased available charged amount of whole group of cells.

Also, voltage measuring apparatuses, which alternately measures a voltage of each cell module which constitutes the group of cells using a switch element composed of a Pch MOS-FET and a Nch MOS-FET, is disclosed (for example, see JP 4095089 B2). According to this apparatus, because a high-speed switch element composed of the Pch MOS-FET and the Nch MOS-FET is used, the voltage of each cell module can be measured with high-accuracy and high-speed when the group of cells is in process of charging/discharging. As a result, the deviation of the voltage of each cell modules can be detected at early stage so as to take an appropriate action.

Further, an apparatus, which measures a voltage of each cell module which constitutes an assembled battery by a monitoring unit, electrically isolates the voltage measured by the monitoring unit via a photo coupler, and transmits the isolated voltage to an outer controlling unit, is disclosed (for example, see JP 08-140204 A). According to this apparatus, because a voltage path of the assembled battery is isolated from a voltage path of the controlling unit via the photo coupler, for example, even if the voltage of the assembled battery is high, high voltage is not applied to the controlling unit. For this reason, there is no fear of voltage breakdown of the controlling unit caused by high voltage of the assembled battery. Also, because a withstand voltage of the controlling unit can be lowered, low cost of the controlling unit can be achieved.

However, the charging apparatus disclosed in JP 2008-092717 A needs a cycle power source to generate AC voltage which is the repeated signal. Also, a specific storage battery cell (or a specific cell module composed of a plurality of storage battery cells connected in series) can be charged, but can not be discharged. That is, in order to allow the specific cell module to be discharged, it is necessary to combine the cell module with a discharge circuit composed of a resistor, etc. This combination allows the charged amount of the cell modules to be wasted as Joule's heat, and this is an undesirable result from the viewpoint of an effective use of energy of cell. Also, in apparatuses disclosed in JP 4095089 B2 and JP 08-140204 A, in order to operate a measuring circuit to measure a voltage of the cell module, it is necessary to use a DC/DC converting power supply (DC/DC converter) whose breakdown voltage (for example, 400 V) is higher than the voltage of the assembled battery, or to use the target cell (i.e., the cell module) as the power supply. Therefore, a configuration of the measuring circuit to measure the voltage of the cell module becomes complicated.

Further, in apparatuses disclosed in JP 4095089 B2 and JP 08-140204 A, a configuration in which cell controlling module circuit are sequentially connected to an assembled battery is disclosed. However, when a DC/DC converter is used for every cell controlling module circuit as a power supply to operate this cell controlling module circuit, a power supply apparatus becomes expensive because the more the number of cells in the assembled battery, the higher the breakdown voltage of the DC/DC converter. Also, when the target assembled battery is used as a power supply, the assembled battery may be discharged by the cell controlling module circuit during non-operating time period. For this reason, if the cell controlling module circuit is isolated from the power supply in order to decrease a discharged amount of the assembled battery, some kind of power to activate the cell controlling module circuit is needed. Also, when the target is a fuel cell, the fuel cell may not be used as the power supply because a voltage on the fuel cell side may be lower than a minimum operating voltage of the cell controlling module circuit.

A power supplying apparatus, which supplies power to a plurality of loads such as a plurality of measuring circuits and a plurality of cell controlling module circuits, etc to measure charged amounts of a plurality of cell modules and voltages of a plurality of cell modules, has been needed.

Therefore, an object of the present invention is to provide a power supplying apparatus for supplying power to a plurality of loads.

SUMMARY OF THE INVENTION

In order to achieve the above object, the present invention provides a power supplying apparatus for supplying power to a plurality of loads, including: a rectifying circuit connected to each of the plurality of loads; an AC circuit to sequentially connect between the rectifying circuits; and an AC generating circuit to apply AC voltage to the AC circuit, in which the AC circuit includes a capacitor and an inductor connected in series.

According to the power supplying apparatus of the present invention, each of the plurality of loads includes the rectifying circuit, the AC circuit to sequentially connect between the rectifying circuits, and the AC generating circuit to apply AC voltage to the AC circuit, where the AC circuit includes the capacitor and the inductor connected in series. As a result, because a resonance frequency of any one of loads becomes the same as that of any other load, the same value of current can be passed through all of the loads.

Also, the present invention provides a power supplying apparatus for supplying power to a plurality of loads, including: rectifying circuits connected to the plurality of loads respectively; AC circuits to sequentially connect between the rectifying circuits; and AC generating circuits to apply AC voltages to the AC circuit, in which the AC circuit includes capacitors connected in series, and a frequency of the AC voltage generated by the AC generating circuit is variable in accordance with transfer characteristics of the AC circuit formed between the AC generating circuit and the selected rectifying circuit.

According to the power supplying apparatus of the present invention, each of the plurality of loads includes the rectifying circuit, the AC circuit to sequentially connect between the rectifying circuits, and the AC generating circuit to apply AC voltage to the AC circuit, where the AC circuit includes the capacitors connected in series. Also, because the frequency of the AC generating circuit is variable in accordance with the selected load, a constant current value can be supplied to each of the loads.

Also, the present invention provides a power supplying apparatus for independently adjusting charged amount of cell modules of an assembled battery in which the cell modules composed of at least one cell are connected in series, including: a plurality of controlling modules connected to positive and negative electrodes of the cell modules, wherein each of the controlling module including: a positive terminal and a negative terminal connected to each of the cell modules; an AC generating circuit which is connected to the positive terminal and the negative terminal and generates an AC voltage by using the cell modules as a power source; a rectifying circuit to rectify the AC voltage; a controlling terminal which connects an output side of the AC generating circuit and an input side of the rectifying circuit and to which the AC voltage is applied; and a switch element to connect or disconnect between at least one of the positive terminal and the negative terminal and an output terminal of the rectifying circuit, in which a capacitor is connected between the controlling terminals of the adjacent controlling modules, the AC generating circuit in any one of the controlling modules is operated to discharge the cell modules connected thereto, meanwhile the switch elements in other controlling modules are closed so that DC voltages output from the rectifying circuits is applied to the cell modules connected thereto.

DETAILED DESCRIPTION OF THE PREFERRED EMBODIMENTS

Figure 1:
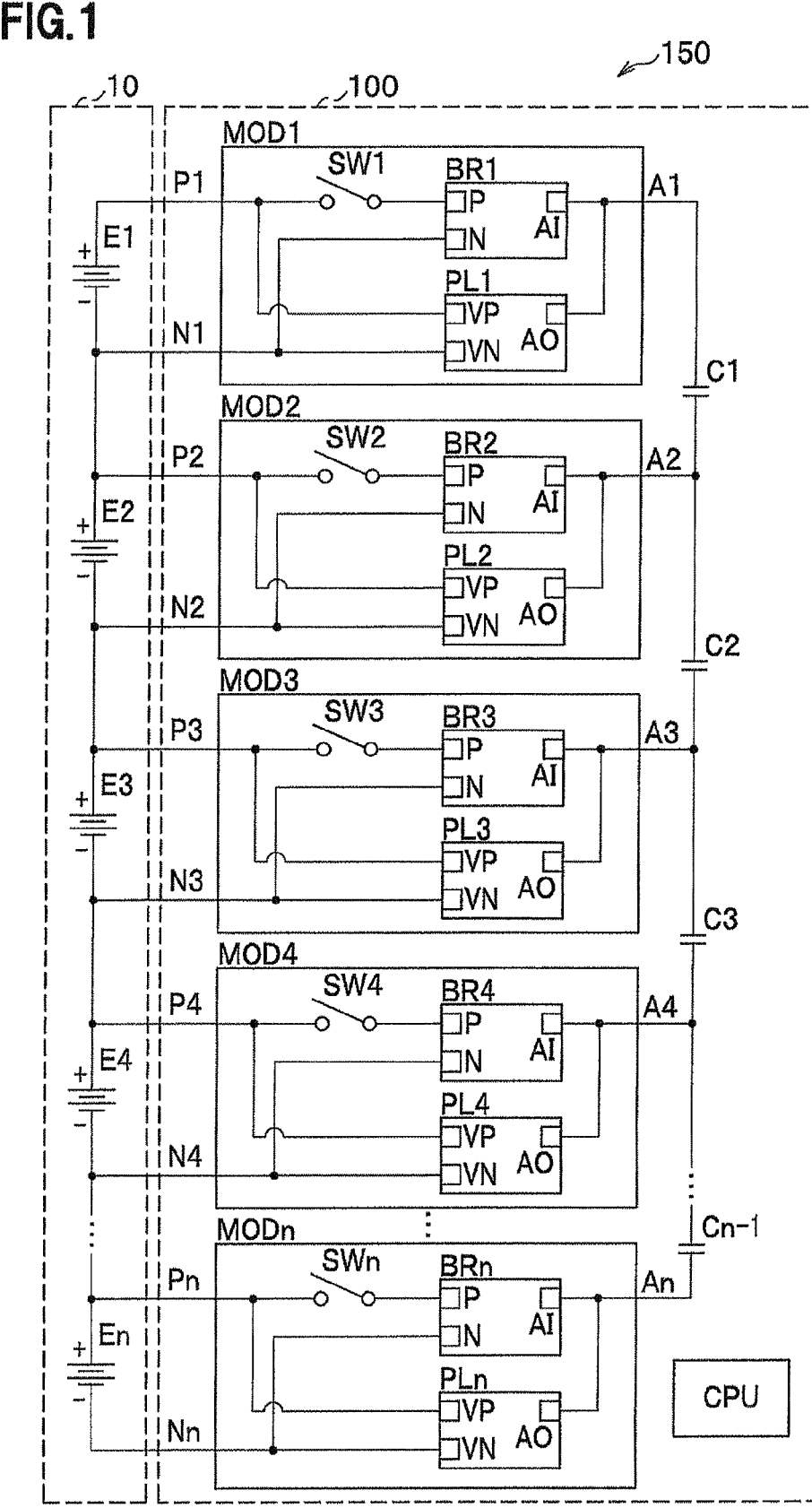
FIG. 1 shows a block diagram of a power supplying system (charging/discharging system) in accordance with a first embodiment of the present invention.

Referring to drawings, some embodiments of the power supplying apparatus in accordance of the present invention will be explained below. In addition, because the same components will be denoted by the same reference numerals in the drawings, a duplicated explanation will be omitted.

First Embodiment

Referring to drawings, one embodiment of power supplying apparatuses (charging/discharging apparatuses) in accordance of the present invention will be explained.

In the block diagram shown in FIG. 1, a power supplying system (charging/discharging system) 150 includes an assembled battery 10 in which cell modules E1, E2, . . . , En each of which is composed of a plurality of capacitor cells are connected in series; and a power supplying apparatus 100 which allows each of the cell modules E1, E2, . . . , En to be charged/discharged, where any one of cell modules having high charging voltage is discharged, and any one of the other cell modules having low charging voltage is charged by the discharged power.

The power supplying apparatus 100 includes controlling modules MOD1, MOD2, . . . , MODn corresponding to the target cell modules E1, E2, . . . , En; a plurality of capacitors C1, C2, . . . , C(n−1); and a controlling unit CPU to control each portion, where the controlling module MODn includes a switch element SWn, a rectifying circuit BRn, and an AC generating circuit PLn. In addition, the storage battery cell is composed of, for example, a secondary battery such as a lithium-ion battery, etc, and the plurality of cell modules E1, E2, . . . , En are configured in accordance with the same standard.

The controlling module MODn includes the switch element SWn, the rectifying circuit BRn, and the AC generating circuit PLn, where a positive terminal Pn is connected to a positive electrode of the cell module En, and a negative terminal Nn is connected to a negative electrode of the cell module En. The positive terminal Pn is connected to one end of the switch element SWn and a positive electrode input terminal VP of the AC generating circuit PLn, the negative terminal Nn is connected to a negative electrode input terminal VN of the AC generating circuit PLn and a negative terminal N of the rectifying circuit BRn, and other end of the switch element SWn is connected to a positive terminal P of the rectifying circuit BRn. Also, an AC input terminal AI of the rectifying circuit BRn and an AC output terminal AO of the AC generating circuit PLn are connected to a controlling terminal An.

Also, a capacitor C1 is connected between a controlling terminal A1 and a controlling terminal A2, and a capacitor C2 is connected between a controlling terminal A2 and a controlling terminal A3. Likewise, a capacitor C(n−1) is connected between a controlling terminal A(n−1) and the controlling terminal An.

Figure 2:
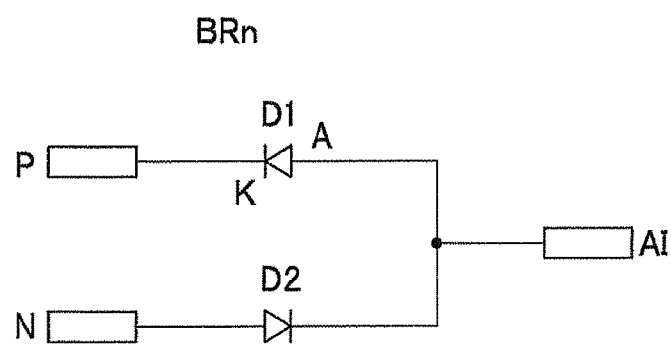
FIG. 2 shows a circuit diagram of a rectifying circuit used for the power supplying apparatus (charging/discharging apparatus) in accordance with the first embodiment of the present invention.

FIG. 2 shows an inner circuit diagram of the rectifying circuit BRn. The rectifying circuit BRn includes two diodes D1 and D2, an anode of the diode D1 and a cathode of the diode D2 are connected to an AC input terminal AI, a cathode of the diode D1 is connected to the positive terminal P, and an anode of the diode D2 is connected to the negative terminal N. For this reason, the rectifying circuit BRn allows current to pass from the AC input terminal AI to the positive terminal P, allows current to pass from the negative terminal N to the AC input terminal AI, and rectifies an alternating current passing through the AC input terminal AI.

Figure 3:
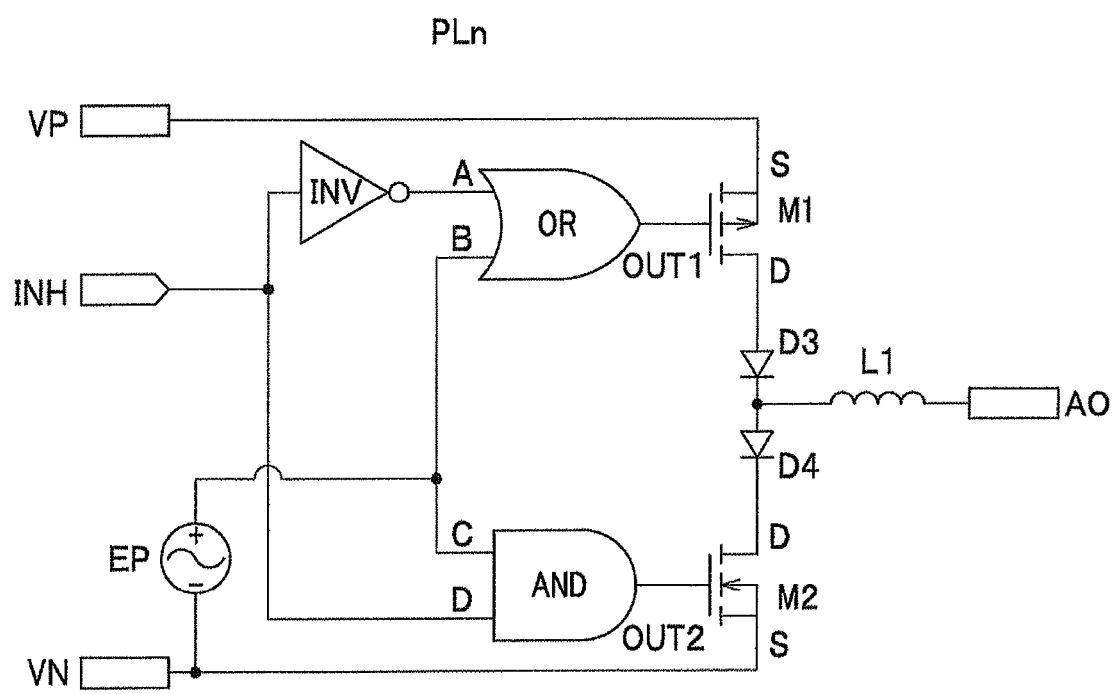
FIG. 3 shows a circuit diagram of an AC generating circuit used for the charging/discharging apparatus in accordance with the first embodiment of the present invention.

FIG. 3 shows an inner circuit diagram of the AC generating circuit PLn. The AC generating circuit PLn includes an AND gate, an OR gate, an inverter INV, a p-MOS transistor M1, a n-MOS transistor M2, diodes D3 and D4, a wiring inductance L1, and a rectangular wave power supply EP. The positive electrode input terminal VP is used as a positive electrode power supply of the AND gate, OR gate, and inverter INV, and is connected to a source of the p-MOS transistor M1. The negative electrode input terminal VN is used as a negative electrode power supply of the AND gate, OR gate, and inverter INV, and is connected to a source of the n-MOS transistor M2. A drain of the p-MOS transistor M1 is connected to a drain of the n-MOS transistor M2 via a series circuit of the diodes D3 and D4. A junction point between the diodes D3 and D4 is connected to the AC output terminal AO via the wiring inductance L1.

The rectangular wave power supply EP is connected to an input terminal B of the OR gate and an input terminal C of the AND gate. Also, an inhibit terminal INH is connected to an input terminal D of the AND gate and an input terminal of the inverter INV, and an output terminal of the inverter INV is connected to an input terminal A of the OR gate. Further, an output terminal OUT1 of the OR gate is connected to a gate of the p-MOS transistor M1, and an output terminal OUT2 of the AND gate is connected to a gate of the n-MOS transistor M2.

By this circuitry, in the AC generating circuit PLn, when the inhibit terminal INH is at high-level, the p-MOS transistor M1 and the n-MOS transistor M2 switch ON and OFF alternately depending on a transition of the rectangular wave power supply EP. As a result, a potential of the AC output terminal AO varies between a potential of the positive terminal P and a potential of the negative terminal N, and the AC generating circuit PLn generates an AC voltage. Also, the AC generating circuit PLn allows a rectangular wave current to pass via the AC output terminal AO. In addition, the wiring inductance L1 limits change in the current when a potential of the AC output terminal AO transitions.

(Operation of Charging/Discharging Apparatus)

Next, referring to FIGS. 1 and 2, in the case where the number of the cell modules is four, an operation of charging/discharging in which the cell module E4 is discharged and the cell module E1 is charged will be explained. When an AC generating circuit PL4 operates, a potential of a controlling terminal A4 oscillates between potentials of a positive terminal P4 and a negative terminal N4 of a cell module E4. Here, a charging voltage of the cell module E4 is higher than that of a cell module E1. When a potential of the controlling terminal A4 is equal to that of the negative electrode of the cell module E4, a charging voltage of the capacitor C1 is approximately equal to a voltage V2 of the cell module E2, a charging voltage of the capacitor C2 is approximately equal to a voltage V3 of the cell module E3, and a charging voltage of a capacitor C3 is approximately equal to a voltage V4 of the cell module E4.

Here, assume that a switch element SW1 is set to ON, and switch elements SW2, SW3, and SW4 are set to OFF. When the potential of the controlling terminal A4 transitions from the potential of the negative terminal N4 of the cell module E4 to the potential of the positive terminal P4, current does not flow into the controlling terminals A2 and A3, and the capacitors C1, C2, and C3 charge the cell modules E1, E2, and E3 via the controlling terminal A1, a rectifying circuit BR1, the switch element SW1, and a positive terminal P1.

Next, when the potential of the controlling terminal A4 transitions from the potential of positive terminal P4 to the potential of the negative terminal N4, the cell modules E2, E3, and E4 charge the capacitors C1, C2, and C3. When this process is repeated, the cell modules E2 and E3 repeat charging and discharging alternately, the cell module E4 is discharged, and the cell module E1 is charged. That is, the cell module E4 is discharged, and the cell module E1 is charged by the discharged power.

Also, the operation is similar in any other combination. For example, when the voltage of the cell module E2 is low and the voltage of the cell module E3 is high, the switch element SW2 may be turned ON and the switch elements SW1, SW3, and SW4 may be turned OFF so as to operate an AC generating circuit PL3. In this case, a potential of a controlling terminal A3 of a controlling module MOD3 oscillates between potentials of a positive terminal P3 and a negative terminal N3 of a cell module E3. For this reason, a charging current flows into the cell module E2 via the capacitor C2, a rectifying circuit BR2, and the switch element SW2, thereby discharging the cell module E3 and charging the cell module E2.

Second Embodiment

Although capacitors C1, C2, C3, ..., C(n−1) connected in series form single row in the first embodiment, they may form more than or equal to two rows.

Figure 4:
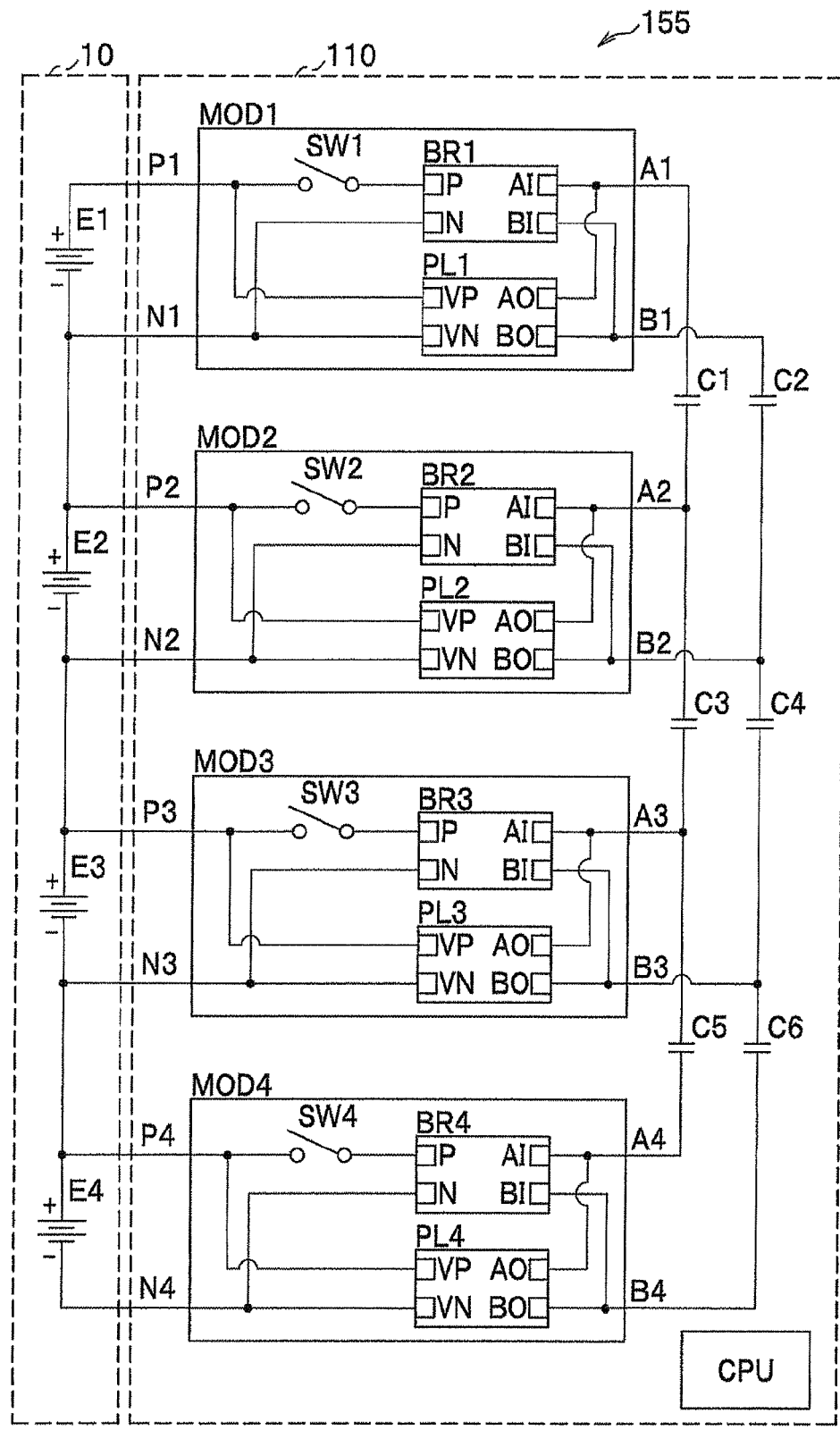
FIG. 4 shows a block diagram of a power supplying system in accordance with a second embodiment of the present invention.
Figure 5:
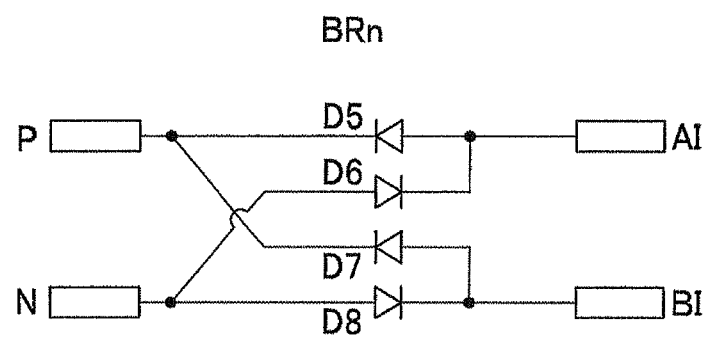
FIG. 5 shows a circuit diagram of a rectifying circuit used for the power supplying system shown in FIG. 4.
Figure 6:
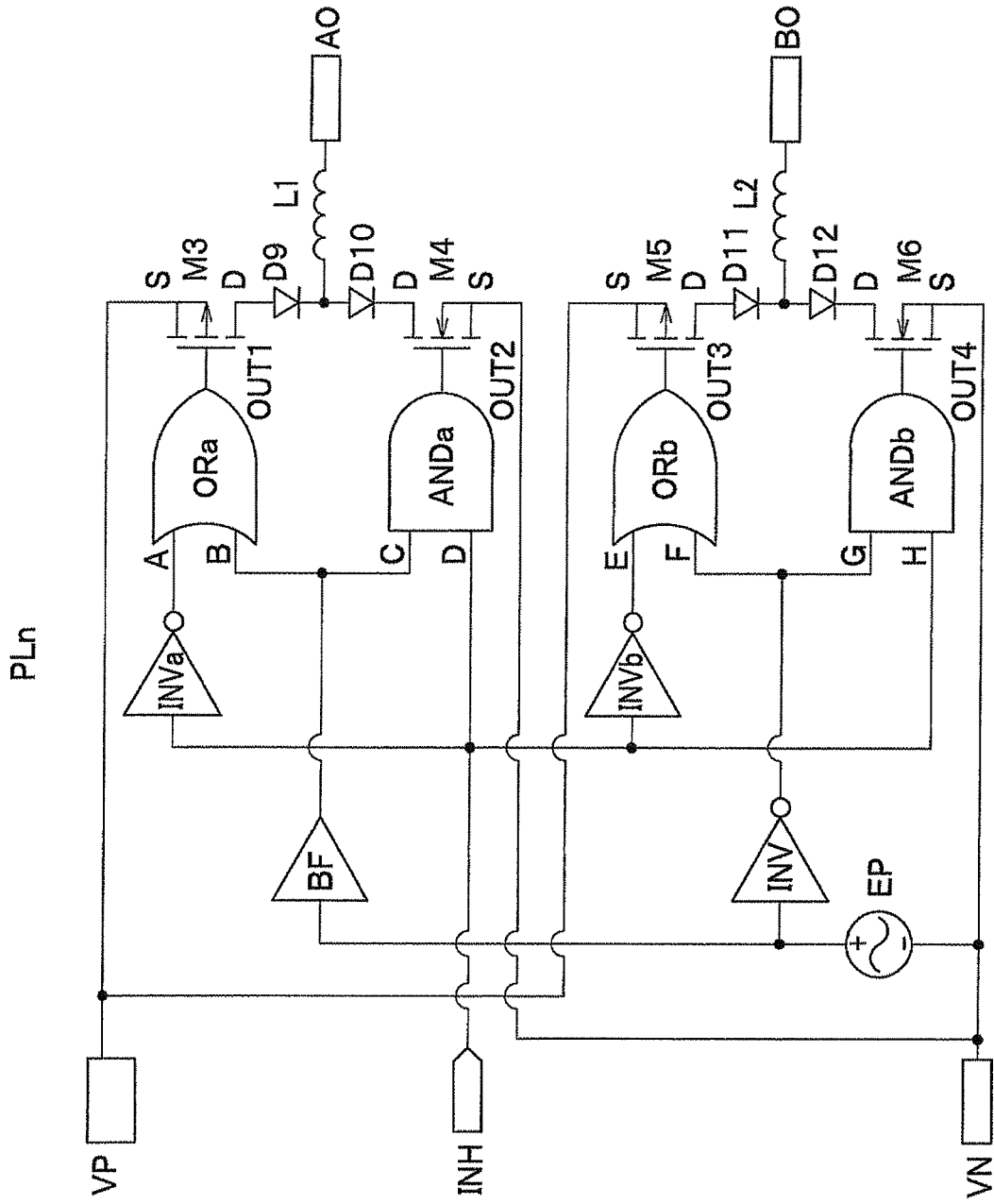
FIG. 6 shows a circuit diagram of an AC generating circuit used for the power supplying system shown in FIG. 4.
Figure 7:
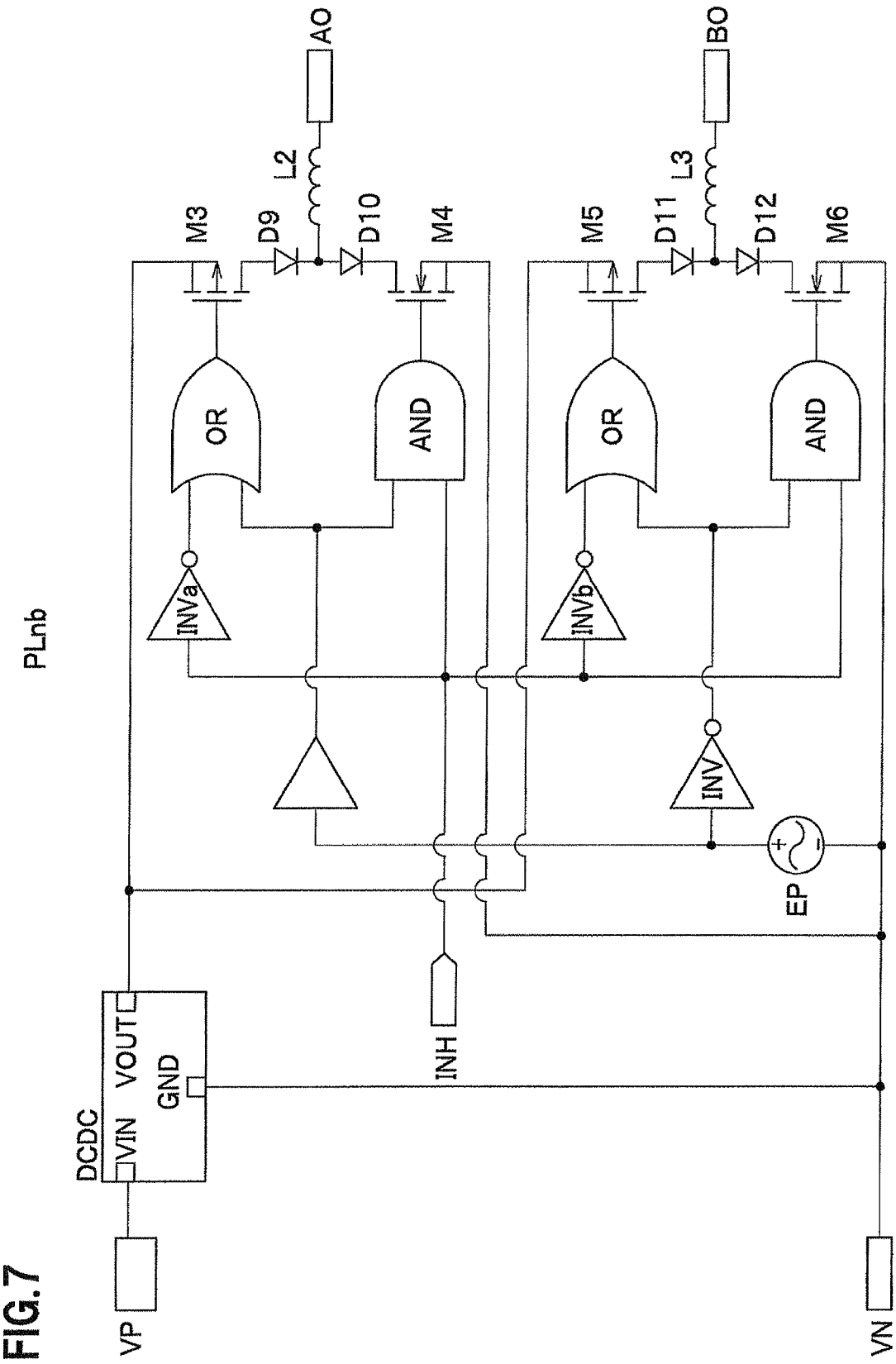
FIG. 7 shows circuit diagram of an AC generating circuit used for a charging/discharging apparatus in accordance with a third embodiment of the present invention.

FIG. 4 shows a block diagram of a power supplying system in accordance of a second embodiment of the present invention. Also, FIG. 5 shows a circuit diagram of the rectifying circuit used for the power supplying system shown in FIG. 2, and FIG. 6 shows a circuit diagram of the AC generating circuit used for the power supplying system shown in FIG. 2. FIG. 7 shows a circuit diagram of an AC generating circuit used for a charging/discharging apparatus in accordance with the second embodiment of the present invention.

In FIG. 4, a power supplying system (charging/discharging system) 155 includes an assembled battery 10 in which cell modules E1, E2, E3, and E4 each of which is composed of a plurality of storage battery cells are connected in series; and a power supplying apparatus (charging/discharging apparatus) 110 which allows each of the cell modules E1, E2, E3, and E4 to be charged/discharged, where any one of cell modules having high charging voltage is discharged, and any one of other cell modules having low charging voltage is charged by the discharged power. In addition, in the power supplying system shown in FIG. 4, four cell modules E1, E2, E3, and E4 are connected in series for purposes of explanation. However, more cell modules E1, E2, ..., En may be connected in series.

The power supplying apparatus 110 includes controlling modules MOD1, MOD2, MOD3, and MOD4 corresponding to the cell modules E1, E2, E3, and E4 to which power is supplied; a plurality of capacitors C1, C2, ..., C6; and a controlling unit CPU (controller) to control each unit.

Also, the controlling module MODn includes a switch element SWn, a rectifying circuit BRn, and an AC generating circuit PLn (n=1, 2, 3, 4).

The controlling unit CPU, for example, controls the switch element SWn of the controlling module MODn to be turned ON and OFF, and controls a frequency of the AC generating circuit PLn.

In addition, the storage battery cell is composed of, for example, a secondary battery such as a lithium-ion battery, etc, and the plurality of cell modules E1, E2, E3, and E4 are configured in accordance with the same standard. However, a deviation of an internal impedance for every cell modules exists.

Also, in the controlling module MODn, the positive terminal Pn is connected to the positive electrode of the cell module En, and the negative terminal Nn is connected to the negative electrode of the cell module En. The positive terminal Pn is connected to one end of the switch element SWn and the positive electrode input terminal VP of the AC generating circuit PLn, the negative terminal Nn is connected to the negative electrode input terminal VN of the AC generating circuit PLn and the negative terminal N of the rectifying circuit BRn, and the other end of the switch element SWn is connected to the positive terminal P of the rectifying circuit BRn. Also, the AC input terminal AI of the rectifying circuit BRn and the AC output terminal AO of the AC generating circuit PLn are connected to the controlling terminal An.

Also, the capacitor C1 is connected between the controlling terminal A1 and the controlling terminal A2, the capacitor C2 is connected between a controlling terminal B1 and a controlling terminal B2, the capacitor C3 is connected between the controlling terminal A2 and the controlling terminal A3, a capacitor C4 is connected between the controlling terminal B2 and a controlling terminal B3, a capacitor C5 is connected between the controlling terminal A3 and the controlling terminal A4, and a capacitor C6 is connected between the controlling terminal B3 and a controlling terminal B4 so as to constitute an electrical circuit. That is, a power supplying system 155 shown in FIG. 4 is a circuit diagram of a power supplying system in which three capacitors C1, C3, and C5 are connected in series in one system and three capacitors C2, C4, and C6 are connected in series in another system. In addition, the plurality of loads in this embodiment are the cell modules E1, E2, E3, and E4.

In more detail, in FIG. 4, the power supplying system 155 includes the assembled battery 10 and the power supplying apparatus 110, the power supplying apparatus 110 includes the controlling modules MOD1, MOD2, MOD3, and MOD4, a series circuit of the capacitors C1, C3, and C5, and a series circuit of the capacitors C2, C4, and C6, and every controlling module MODn includes the rectifying circuit BRn, the AC generating circuit PLn, and the switch element SWn. Also, the rectifying circuit BRn includes the positive terminal P, the negative terminal N, and two AC input terminals AI and BI, and rectifies an AC voltage. Also, the AC generating circuit PLn includes the positive electrode input terminal VP, the negative electrode input terminal VN, and two AC output terminals AO and BO, and generates two-phase rectangular wave voltages using a voltage of the cell module En.

Also, each of input sides of the positive terminal P and negative terminal N of the rectifying circuit BRn, and the positive electrode input terminal VP and negative electrode input terminal VN of the AC generating circuit PLn are connected to the positive terminal Pn and negative terminal Nn of each of the cell modules En.

Next, a configuration of each output side of the AC input terminals AI and BI of the rectifying circuit BRn and the AC output terminals AO and BO of the AC generating circuit PLn will be explained. In the controlling module MOD1, the AC input terminal AI of the rectifying circuit BR1 and the AC output terminal AO of the AC generating circuit PL1 are connected to the controlling terminal A1, and the AC input terminal BI of the rectifying circuit BR1 and the AC output terminal BO are connected to the controlling terminal B1. Likewise, in the controlling module MOD4, the AC input terminal AI of the rectifying circuit BR4 and the AC output terminal AO of the AC generating circuit PL4 are connected to the controlling terminal A4, and the AC input terminal BI and the AC output terminal BO are connected to the controlling terminal B4.

Also, the capacitors C1, C3, and C5 are connected between the controlling terminals A1, A2, and A3 and the controlling terminals A2, A3, and A4 respectively, and the capacitors C2, C4, and C6 are connected between the controlling terminals B1, B2, and B3 and the controlling terminals B2, B3, and B4 respectively.

FIG. 5 shows a circuit diagram of the rectifying circuits BR1, BR2, ..., BR4 shown in FIG. 4. The rectifying circuit BRn includes four diodes D5, D6, D7, and D8, and forms a bridge rectifying circuit. That is, in the rectifying circuit BRn, cathodes of the diodes D5 and D7 are connected to the positive terminal P, anodes of the diodes D6 and D8 are connected to the negative terminal N, the anode of the diode D5 and the cathode of the diode D6 are connected to the AC input terminal AI, and the anode of the diode D7 and the cathode of the diode D8 are connected to the AC input terminal BI. For this reason, in the rectifying circuit BRn, AC input voltages applied to the AC input terminals AI and BI are full-wave rectified, and rectified voltages are output to the positive terminal P and the negative terminal N. In other words, an alternating current passing via the AC input terminal AI is rectified, and a direct current passes via the positive terminal P and the negative terminal N. Also, an alternating current passing via the AC input terminal BI is rectified, and a direct current passes via the positive terminal P and the negative terminal. That is, the rectifying circuit BRn shown in FIG. 5 is a standard full-wave rectifying circuit.

FIG. 6 shows a circuit diagram of the AC generating circuits PL1, PL2, ..., PL4 shown in FIG. 4. The AC generating circuit PLn includes OR gates ORa and ORb, AND gates ANDa and ANDb, inverters INV, INVa and INVb, a buffer BF, p-MOS transistors M3 and M5, n-MOS transistors M4 and M6, diodes D9, D10, D11, and D12, the rectangular wave power supply EP, and wiring inductances L1 and L2.

The rectangular wave power supply EP is connected to inputs of the buffer BF and inverter INV, an output of the buffer BF is connected to an input terminal B of the OR gate ORa and an input terminal C of the AND gate ANDa, and an output of the inverter INV is connected to an input terminal F of the OR gate ORb and an input terminal G of the AND gate ANDb. Also, an inhibit terminal INH is connected to an input terminal A of the OR gate ORa via an inverter INVa, to an input terminal D of the AND gate ANDa, to an input terminal E of the OR gate ORb via an inverter INVb, and to an input terminal H of the AND gate ANDb. Further, an output terminal OUT1 of the OR gate ORa is connected to a gate of the p-MOS transistor M3, an output terminal OUT2 of the AND gate ANDa is connected to a gate of the n-MOS transistor M4, an output terminal OUT3 of the OR gate ORb is connected to a gate of the p-MOS transistor M5, and an output terminal OUT4 of the AND gate ANDb is connected to a gate of the n-MOS transistor M6.

A source of the p-MOS transistor M3 is connected to an input terminal VP of the positive electrode, and a drain is connected to a drain of the n-MOS transistor M4 via diodes D9 and D10. A source of the n-MOS transistor M4 is connected to the negative electrode input terminal VN. Further, a connection terminal of the diodes D9 and D10 is connected to an AC output terminal AO via the wiring inductance L1. Also, a connection terminal of the diodes D11 and D12 is connected to an AC output terminal BO via the wiring inductance L2.

An output terminal OUT3 of the OR gate ORb is connected to a gate of the p-MOS transistor M5, and an output terminal OUT4 of the AND gate ANDb is connected to a gate of the n-MOS transistor M6. A source of the p-MOS transistor M5 is connected to a positive electrode input terminal VP, and a drain is connected to a drain of the n-MOS transistor M6 via the diodes D11 and D12. A source of the n-MOS transistor M6 is connected to a negative electrode input terminal VN. Also, a connection terminal of the diodes D11 and D12 is connected to the AC output terminal BO via the wiring inductance L2.

With such configuration, in synchronization with the rectangular wave power supply EP, the AC generating circuit PLn allows the AC output terminals AO and BO to output the rectangular wave voltages reversed to each other. That is, the p-MOS transistor M3 and the n-MOS transistor M4 are switched ON and OFF alternately, the p-MOS transistor M5 and the n-MOS transistor M6 is switched ON and OFF alternately in opposite phase, thereby outputting rectangular wave currents in opposite phase via the AC output terminals AO and BO.

In FIG. 4, for example, assume that the voltage of the cell module E4 is higher than that of the cell module E1 by deviations of the charging voltage. Here, the switch element SW1 is set to ON, and the switch elements SW2, SW3, and SW4 are set to OFF. When the AC generating circuit PL4 operates so as to output AC voltages from the AC output terminals AO and BO, potentials of the controlling terminals A4 and B4 oscillate between potentials of the positive terminal P4 and negative terminal N4 of the cell module E4 respectively. Being potentials of the controlling terminals A1 and B1 reversed alternately, the cell module E4 is discharged, the rectifying circuit BR1 is charged by the discharged energy, and the cell module E1 is charged via the switch element SW1 by the discharged energy. That is, the controlling modules MOD1, MOD2, MOD3, and MOD4 operate likewise in any combination of the switch elements SW1, SW2, SW3, and SW4 by selection, and the cell module at low voltage is charged by the discharged energy from the cell module at high voltage.

Also, although the capacitors connected in series form two rows in the power supplying apparatus 110, they may form more than or equal to three rows. In this case, the AC generating circuit may generate m-phase AC voltages (multi-phase AC voltages), and the rectifying circuit may constitute a m-phase bridge (a multi-phase bridge). In this case, the controlling terminal An outputs a voltage having one phase, and each of the other controlling terminals Bn, Cn, Dn, ... outputs each of the other voltages having (m−1) phases respectively. Also, the rectifying circuit BRn m-phase full-wave rectifies the m-phase AC voltages applied to the in controlling terminals, and in capacitors Cn are connected between the m controlling terminals of the adjacent controlling modules.

Here, referring to FIGS. 4, 5, and 6, a charging/discharging operation in the case where the cell module E4 at high voltage is discharged and the cell module E1 at low voltage is charged will be explained in detail. When the AC generating circuit PL4 of the controlling module MOD4 connected to the cell module E4 is operated, the potential of the controlling terminal A4 oscillates between potentials of the positive terminal P4 and negative terminal N4 of the cell module E4. In addition, assume that the charging voltage of the cell module E4 is higher than that of the cell module E1 by the deviation of the charging voltage. When the potential of the controlling terminal A4 is equal to the potential of the negative electrode of the cell module E4, the charging voltage of the capacitor C1 is equal to the voltage V2 of the cell module E2, the charging voltage of the capacitor C3 is approximately equal to the voltage V3 of the cell module E3, and the charging voltage of the capacitor C5 is approximately equal to the voltage V4 of the cell module E4.

Here, assume that a switch element SW1 is set to ON, and switch elements SW2, SW3, and SW4 are set to OFF. When the potential of the controlling terminal A4 transitions from the potential of the negative terminal N4 of the cell module E4 to the potential of the positive terminal P4, current does not flow into the controlling terminals A2 and A3, and the capacitors C1, C3, and C5 charge the cell modules E1, E2, and E3 via the controlling terminal A1, a rectifying circuit BR1, the switch element SW1, and a positive terminal P1.

Next, when the potential of the controlling terminal A4 transitions from the potential of positive terminal P4 to the potential of the negative terminal N4, the cell modules E2, E3, and E4 charge the capacitors C1, C3, and C5. When this process is repeated, the cell modules E2 and E3 repeat charging and discharging alternately, the cell module E4 is discharged, and the cell module E1 is charged. That is, the cell module E4 is discharged, and the cell module E1 is charged by the discharged power.

Also, the operation is similar in any other combination. For example, when the voltage of the cell module E2 is low and the voltage of the cell module E3 is high, the switch element SW2 may be turned ON and the switch elements SW1, SW3, and SW4 may be turned OFF. In this case, a potential of a controlling terminal A3 of a controlling module MOD3 oscillates between potentials of a positive terminal P3 and a negative terminal N3 of a cell module E3. For this reason, a charging current flows into the cell module E2 via the capacitor C3, a rectifying circuit BR2, and the switch element SW2, thereby discharging the cell module E3 and charging the cell module E2.

However, when the cell modules at low voltage is charged by the cell modules at high voltage using the power supplying apparatus of the first embodiment shown in FIG. 4, a number of the capacitors connected in series connected to an alternating-current circuit varies depending on combinations of the cell modules of a charging/discharging route. For this reason, the transfer characteristics of the alternating-current circuit is not uniform, a resonance frequency of the charging current deviates depending on the combination of the cell modules of the charging/discharging route, and every cell module may not be charged uniformly. For example, in FIG. 4, when the cell modules E4-E1 are charged, the capacitors C1, C3, and C5 are connected to the alternating-current circuit in series. However, when the cell modules E4-E3 are charged, the only capacitor C5 is connected to the alternating-current circuit, and a capacitance of the capacitors C1, C3, and C5 becomes smaller than that of the capacitor C5. As a result, the resonance frequency of the charging current of the capacitors C1, C3, and C5 deviates from that of the capacitor C5.

Third Embodiment

Although the voltage of the cell module En is directly applied to a voltage generating circuit as a driving voltage in the second embodiment, a voltage via a step-up DC/DC converter may be used as the driving voltage.

FIG. 7 shows a circuit diagram of the voltage generating circuit with the step-up DC/DC converter.

An AC generating circuit PLnb shown in FIG. 7 includes the step-up DC/DC converter, two OR gates, two AND gates, three inverters, the buffer, the p-MOS transistors M3 and M5, the n-MOS transistors M4 and M6, the diodes D9, D10, D11, and D12, and the rectangular wave power supply EP. Here, because logic circuits other than the step-up DC/DC converter are the same as those in the AC generating circuit PLna shown in FIG. 6, explanations for those are omitted. Also, the step-up DC/DC converter may be applied to the AC generating circuit PLn shown in FIG. 3.

In the AC generating circuit PLnb, a potential difference between the positive electrode input terminal VP and the negative electrode input terminal VN is enlarged (step-up) by the step-up DC/DC converter so as to drive two OR gates, two AND gates, three inverters, the buffer, the p-MOS transistors M3 and M5, and the n-MOS transistors M4 and M6. For this reason, AC voltages having larger oscillations (peak-to-peak values) than voltages of the cell modules E1, E2, . . . , En are output from the AC output terminal AO and the AC output terminal BO.

For this reason, a voltage drop in the charging voltage caused by a voltage drop in the diode used for the rectifying circuits BRn and BRna can be prevented. Therefore, if the voltage at the discharged cell modules is comparable to that of the charged cell modules, a necessary charging current can be kept.

Fourth Embodiment

Although the AC voltages applied to the positive terminal P and the negative terminal N are rectified without being processed in the rectifying circuit of the second embodiment, the AC voltages may be voltage doubler rectified. For this reason, like the third embodiment, if the voltage at the discharged cell modules is comparable to that of the charged cell modules, a necessary charging current can be kept.

Figure 8:
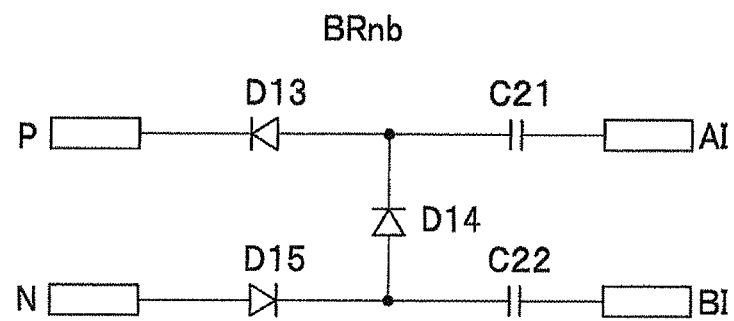
FIG. 8 shows a circuit diagram of a rectifying circuit used for a charging/discharging apparatus in accordance with a fourth embodiment of the present invention.

FIG. 8 shows a circuit diagram of a rectifying circuit with the voltage-doubler rectifying circuit.

A rectifying circuit BRnb includes diodes D13, D14, and D15, and capacitors C21 and C22, the positive terminal P is connected to a cathode of the diode D13, the negative terminal N is connected to an anode of the diode D15, one end of the capacitor C21 is connected to the AC input terminal AI, one end of the capacitor C22 is connected to the AC input terminal BI, a cathode of the diode D14 and the other end of the capacitor C21 are connected to an anode of the diode D13, and a cathode of the diode D15 and the other end of the capacitor C22 are connected to an anode of the diode D14.

For this reason, when voltages are applied to the rectifying circuit BRnb so that the AC input terminal BI becomes a positive electrode and the AC input terminal AI becomes a negative electrode, the capacitor C22 is discharged and the diode D14 side of the capacitor C21 is charged by the positive electrode via the diode D14. At this time, a current does not flow through the diode D13 and the diode D15, and a current from the positive terminal P to the negative terminal N is not generated. Next, when the voltages are applied to the rectifying circuit BRnb so that the AC input terminal AI becomes the positive electrode and the AC input terminal 131 becomes the negative electrode, the capacitor C22 which has already been discharged is charged again via the diode D15 by a potential difference between the negative terminal N and the AC input terminal BI, the capacitor C21 is discharged via the diode D13 by the sum of the increased potential difference of the AC input terminal AI and the charged potential difference of the capacitor C21, and a current is allowed to flow from the positive terminal P to the negative terminal N. That is, if a voltage drop in the diode is removed, a rectified voltage having a peak value which is about two times peak value (peak-to-peak value) of the AC voltage can be obtained by providing a cycle in which the input AC power is once stored in the capacitor.

That is, because voltages having amplitudes which are more than those of the AC voltages applied to the AC input terminals A1 and B1 are applied to the positive terminal P and the negative terminal N regardless the voltage drop in the diode D13 in the rectifying circuit BRnb, an enough charging current flows into the cell module En. Therefore, if the voltage at the discharged cell modules is comparable to that of the charged cell modules, a necessary charging current can be kept.

Modified Fourth Embodiment

Although a single-phase AC voltage is applied to the AC input terminals AI and BI of the rectifying circuit BRnb shown in FIG. 8, two-phase AC voltages may be applied.

Figure 9:
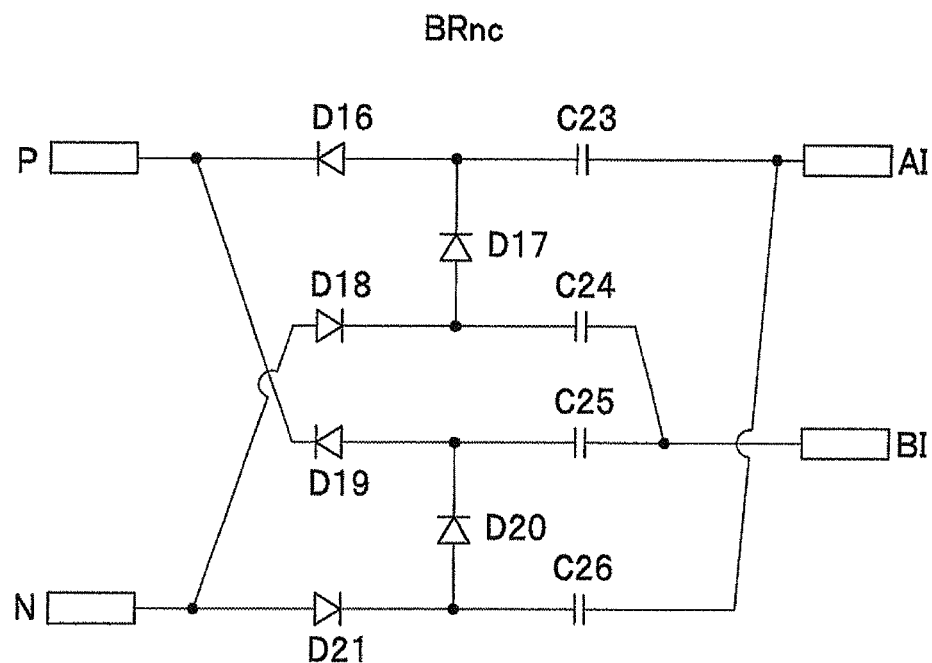
FIG. 9 shows a circuit diagram of another rectifying circuit used for the charging/discharging apparatus in accordance with the fourth embodiment of the present invention.

A rectifying circuit BRnc shown in FIG. 9 has a configuration in which two rectifying circuits shown in FIG. 8 are connected in parallel. That is, in the rectifying circuit BRnc, diodes D16, D17, and D18 and capacitors C23 and C24 constitute a rectifying circuit, and diodes D19, D20, and D21 and capacitors C25 and C26 constitute another rectifying circuit.

For this reason, two-phase AC voltages whose phases are reversed to each other may be applied to the AC input terminals AI and BI. This rectifying circuit BRnc can charge the cell module En at a rate which is twice as fast as that for the rectifying circuit BRnb shown in FIG. 8.

Figure 10:
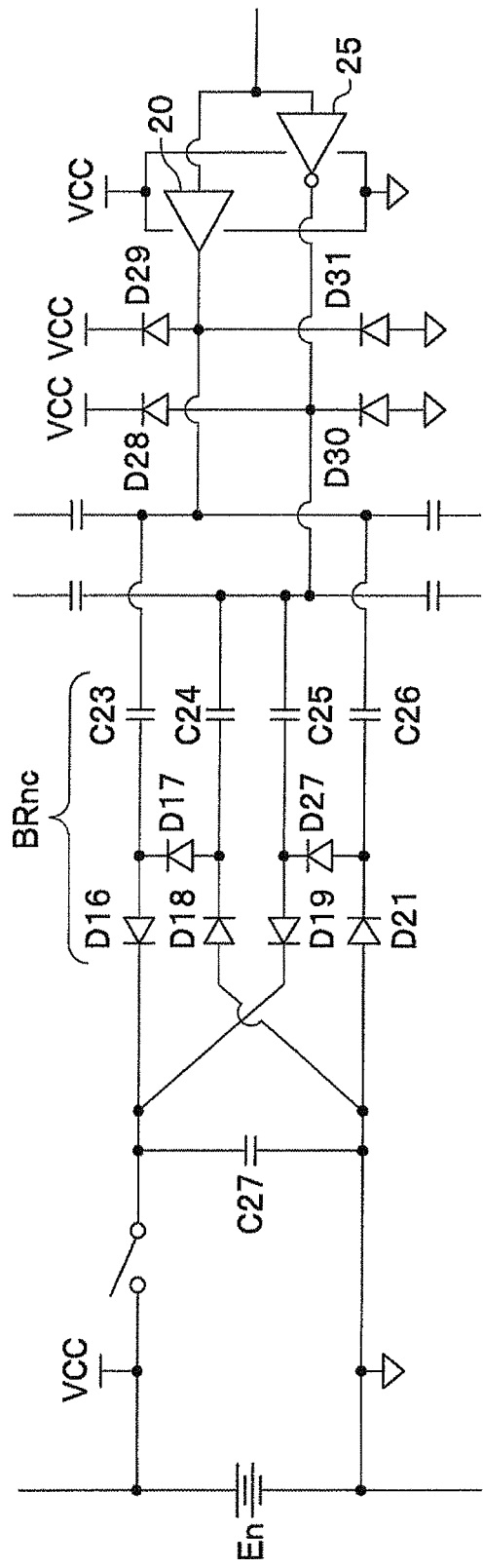
FIG. 10 shows a peripheral circuit diagram of the cell module.

FIG. 10 shows a peripheral circuit diagram of the cell module En in the case where the rectifying circuit BRne shown in FIG. 4 is applied to a charging/discharging apparatus 110. In this case, the two-phase rectifying circuit BRne is operated with reversed phases.

Figure 11:
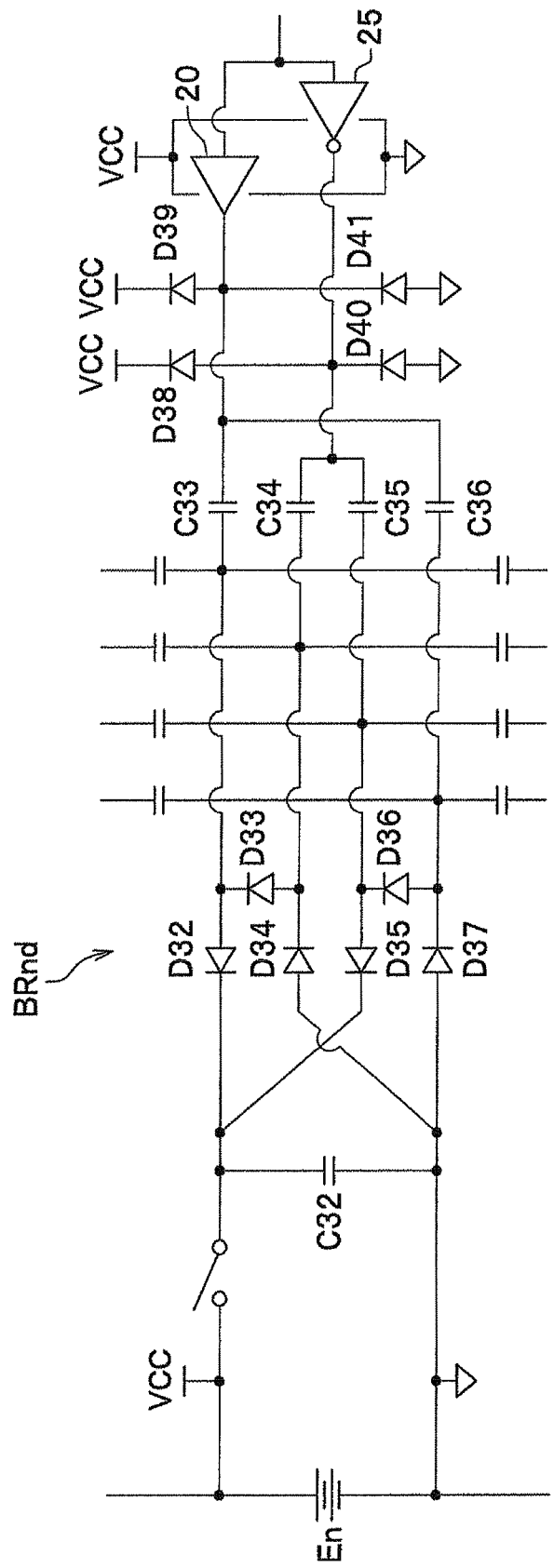
FIG. 11 shows another peripheral circuit diagram of the cell module.

FIG. 11 shows a modified circuit diagram in which a branched portion is provided on a side of the AC generating circuit. That is, a rectifying circuit BRnd includes diodes D32, D33, D34, D35, D36 and D37, and capacitors C33, C34, C35, and C36, and the capacitors connected to the adjacent cell module form four rows. Also, the configuration shown in FIG. 11 differs from the configuration shown in FIG. 10 in that junction points between the capacitors C33, C34, C35, and C36 and the diodes D32, D33, D34, D35, D36 and D37 are connected to four capacitors connected to adjacent cell modules respectively.

Fifth Embodiment

Figure 12:
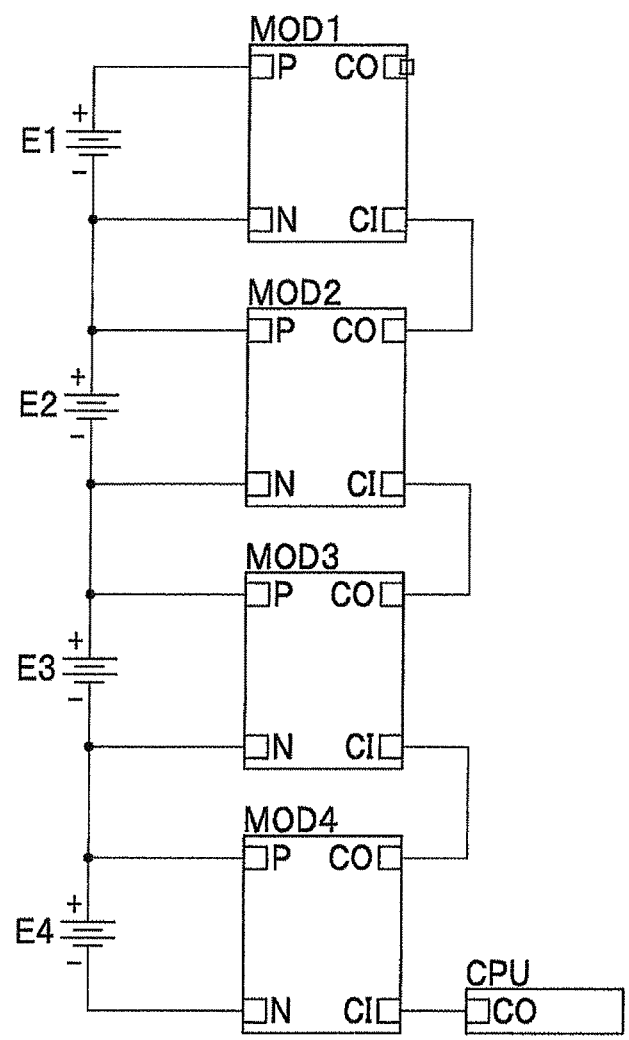
FIG. 12 shows a block diagram in which a clock signal which allows the controlling unit to send a signal is used as a rectangular wave power supply for the AC generating circuit.

FIG. 12 shows a block diagram in which a clock signal which allows the controlling unit to send a signal in serial communication is used as a rectangular wave power supply EP for the AC generating circuit. Controlling modules MOD1, MOD2, MOD3, and MOD4 further include clock input terminals CI and clock output terminals CO, a clock output terminal of the controlling unit CPU is connected to the clock input terminal CI of the controlling module MOD4, the clock output terminal CO of the controlling module MOD4 is connected to the clock input terminal CI of the controlling module MOD3, the clock output terminal CO of the controlling module MOD3 is connected to the clock input terminal CI of the controlling module MOD2, and the clock output terminal CO of the controlling module MOD2 is connected to the clock input terminal CI of the controlling module MOD1.

By using the clock signal as the rectangular wave power supply EP, the need for an oscillator circuit provided in the controlling module is eliminated. Further, by allowing the controlling unit to stop communication, charging/discharging operations between modules are surely stopped, thereby preventing an abrupt generation of the charging/discharging operation.

Sixth Embodiment

Figure 13:
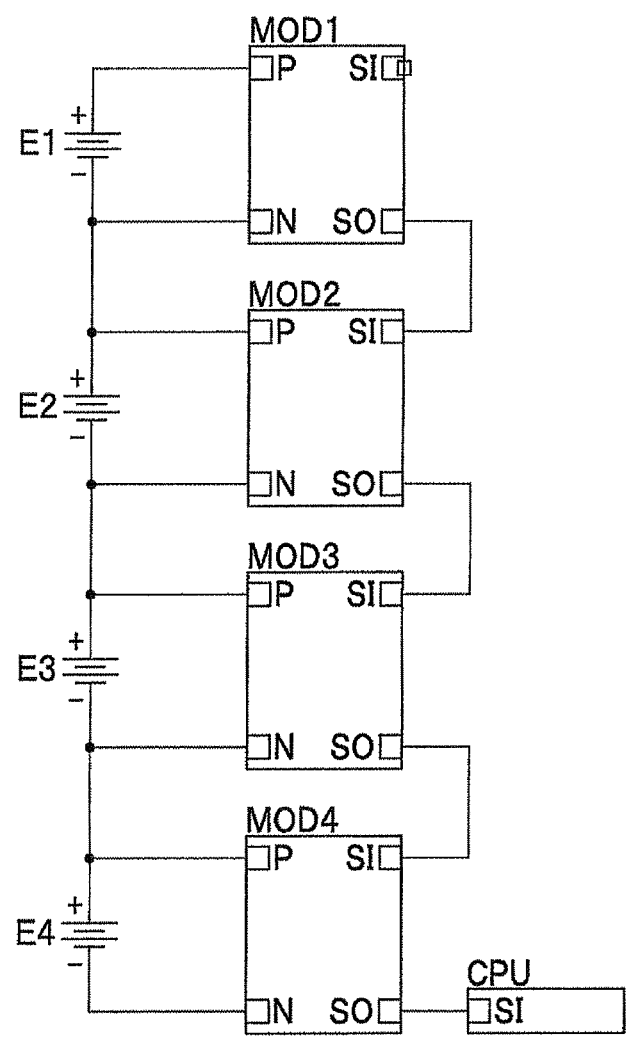
FIG. 13 shows a block diagram in which when the controlling module is under normal operating condition, a predetermined clock signal is sequentially transmitted to an adjusting controlling module, and when an abnormal operating condition is detected, the transmission of the clock signal is stopped.

FIG. 13 shows an example in which when each of the controlling modules is under normal operating condition, a predetermined clock signal is sequentially transmitted to an adjusting controlling module, and when an abnormal operating condition of the controlling module is detected, the transmission of the clock signal is stopped. The controlling modules MOD1, MOD2, MOD3, and MOD4 further include clock input terminals Si and clock output terminals SO, recognize that the controlling module MOD1 is most significant, and send clock signals to the clock output terminals SO regardless input signals to the clock input terminals SI while the controlling module MOD1 is under normal condition. The clock output terminal SO of the controlling module MOD1 is connected to the clock input terminal SI of the controlling module MOD2, and the input signal to the clock terminal SI is transmitted to the clock output terminal SO if the controlling module MOD2 is under normal operating condition. Likewise, the clock output terminal SO of the controlling module MOD2 is connected to the clock input terminal SI of the controlling module MOD3, the clock output terminal SO of the controlling module MOD3 is connected to the clock input terminal SI of the controlling module MOD4, and the clock output terminal SO of the controlling module MOD4 is connected to an input terminal SI of the controlling unit CPU.

When an abnormal condition occurs at any controlling module, the CPU detects the abnormal condition of the controlling module by stopping the clock signal sent to the CPU.

By using the clock signal, which is transmitted between the controlling modules and arrives at the controlling unit, as the rectangular wave power supply EP of the AC generating circuit PLn, the charging/discharging operation can be stopped when an abnormal condition occurs at the controlling module, thereby preventing an abrupt generation of the charging/discharging operation.

(Detailed Description Using an Equivalent Circuit)

Figure 14:
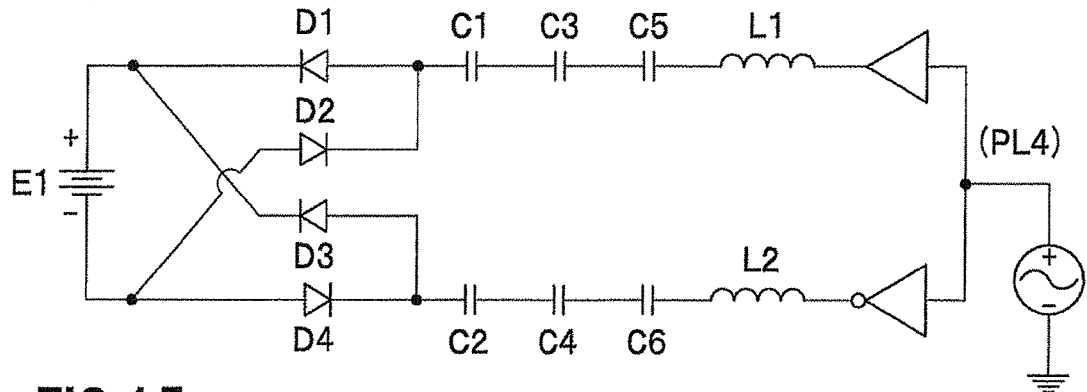
FIG. 14 shows an equivalent circuit in the case where cell modules E4-E1 are charged in the power supplying apparatus shown in FIG. 4.
Figure 15:
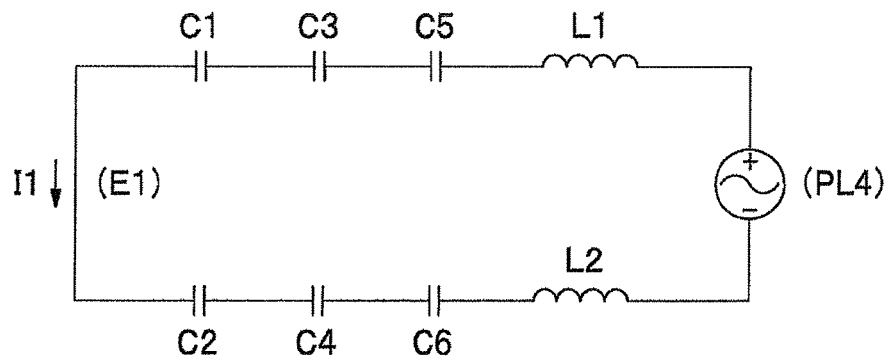
FIG. 15 shows an equivalent circuit in the case where only AC component is considered in FIG. 14.
Figure 16:
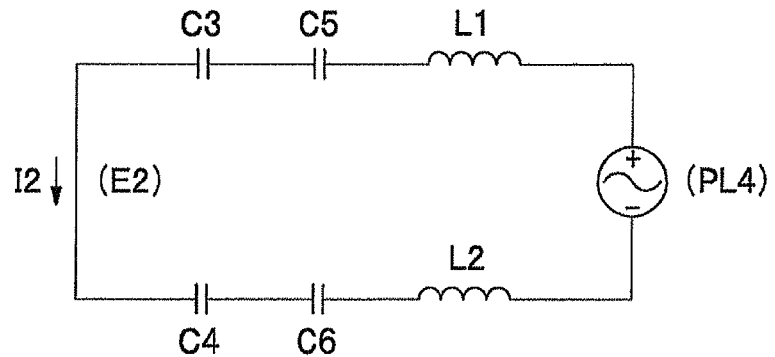
FIG. 16 shows an equivalent circuit in the case where only AC component is considered when cell modules E4-E2 are charged.
Figure 17:
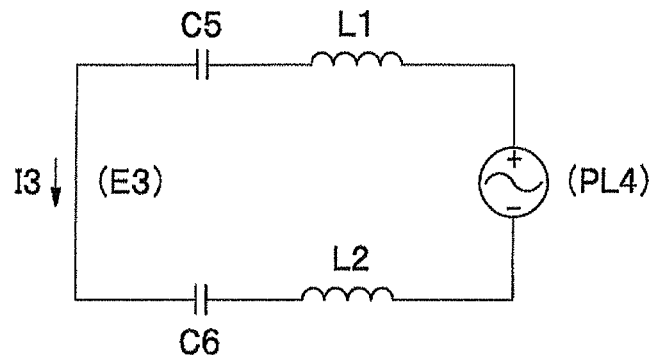
FIG. 17 shows an equivalent circuit in the case where only AC component is considered when cell modules E4-E3 are charged.
Figure 18:
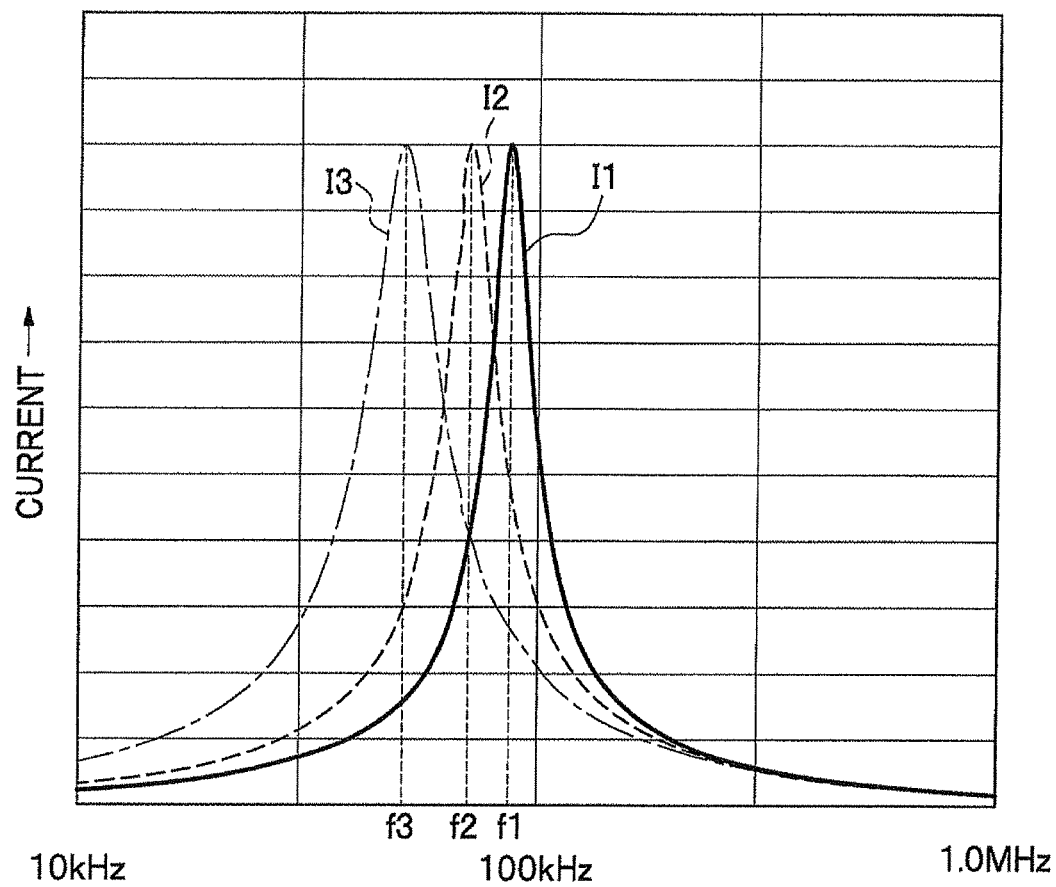
FIG. 18 shows frequency characteristics of a current gain of each of the equivalent circuits shown in FIG. 15, FIG. 16, and FIG. 17.

Here, using an equivalent circuit, the deviation of the resonance frequency explained in the second embodiment will be explained in more detail. FIG. 14 shows an equivalent circuit in the case where cell modules E4-E1 are charged in the power supplying apparatus shown in FIG. 4, and FIG. 15 shows an equivalent circuit in the case where only AC component is considered in FIG. 14. Also, FIG. 16 shows an equivalent circuit in the case where only AC component is considered when cell modules E4-E2 are charged. Further, FIG. 17 shows an equivalent circuit in the case where only AC component is considered when cell modules E4-E3 are charged. Also, FIG. 18 shows frequency characteristics of a current gain of each of the equivalent circuits shown in FIG. 15, FIG. 16, and FIG. 17, where the horizontal axis represents a frequency and the vertical axis represents a current gain.

That is, in the power supplying apparatus shown in FIG. 4, a schematic view of a current path in the case where the cell module E1 at the highest stage is charged from the AC generating circuit PL4 connected to the controlling module MOD4 of the cell module E4 at the lowest stage is like the equivalent circuit shown in FIG. 14. Also, when only AC component is considered in the equivalent circuit shown in FIG. 14 in the interests of more simplicity, the result is the equivalent circuit shown in FIG. 15. In other words, FIG. 15 shows the equivalent circuit in which only AC component is considered in the case where the cell modules E4-E1 are charged.

At this time, when the frequency of the AC generating circuit PL4 is equal to a resonance frequency of the circuit composed of capacitors C and inductors L which form the current path shown in FIG. 15, a charging current I1 supplied to the cell modules E4-E1 is maximized. That is, as shown in FIG. 18, a resonance frequency ($f=1/\omega LC$) of the charging current I1 supplied to the cell modules E4-E1 is shifted toward higher frequency (see the frequency characteristics of the charging current I1 shown in FIG. 18). Because the more the capacitors connected in series of the equivalent circuit as shown in FIG. 15, the less the amount of capacitance C.

Also, in the power supplying apparatus 110 shown in FIG. 4, the equivalent circuit in which only AC component is considered in the case where the cell module E2 at the second stage is charged from the AC generating circuit PL4 connected to the controlling module MOD4 of the cell module E4 at the lowest stage is like that shown in FIG. 16. For this reason, as shown in FIG. 18, a resonance frequency of the charging current I2 supplied to the cell modules E4-E2 is shifted toward somewhat lower frequency (see the frequency characteristics of the charging current I2 shown in FIG. 18). Because the somewhat less the capacitors than those shown in FIG. 15, the somewhat more the amount of the capacitance.

Also, in the power supplying apparatus 110 shown in FIG. 4, the equivalent circuit in which only AC component is considered in the case where the cell module E3 at the third stage is charged from the AC generating circuit PL4 connected to the controlling module MOD4 of the cell module E4 at the lowest stage is like that shown in FIG. 17. For this reason, as shown in FIG. 18, a resonance frequency of the charging current I3 supplied to the cell modules E4-E3 is shifted toward somewhat lower frequency (see the frequency characteristics of the charging current I3 shown in FIG. 18). Because the most less the capacitors, the more the amount of the capacitance.

In addition, FIG. 18 shows frequency characteristics of the current gain in each of the equivalent circuits (i.e., equivalent circuits shown in FIG. 15, FIG. 16, and FIG. 17) where all capacitances of the capacitors are 1 µF, an inductance of the inductor L is 10 µH, and a DC resistance component of the inductor L is 1Ω. That is, as will be appreciated from FIG. 18, because resonance frequencies for the charging current I1 supplied to the cell modules E4-E1, the charging current I2 supplied to the cell modules E4-E2, and the charging current I3 supplied to the cell modules E4-E3 differ from one another, values of currents flowing through charging circuits differ from one another when frequencies of the AC generating circuits PE1, PL2, PL3, and PL4 are all the same. As a result, cell modules E1, E2, E3, and E4 can not be charged equally, thereby preventing voltages at the cell modules E1, E2, E3, and E4 to be uniform.

For this reason, in the power supplying apparatus 110 of the second embodiment, as shown in FIG. 18, a frequency f1 which is the resonance frequency of the charging current I1 is selected in combination of the discharged cell module E4 and the charged cell module E1, a frequency f2 which is the resonance frequency of the charging current I2 is selected in combination of the discharged cell module E4 and the charged cell module E2, and a frequency f3 which is the resonance frequency of the charging current I3 in combination of the discharged cell module E4 and the charged cell module E3. That is, by varying frequency depending on the number of stages of the capacitors in combination of the discharged cell modules and the charged cell modules so that the frequency of the AC generating circuit PL4 becomes the resonance frequency, an amount of the charging current for each of the cell modules E1, E2, and E3 can be made a constant value (for example, a peak value). In this case, the controlling unit CPU variably controls the frequency of the AC generating circuit PL4.

In addition, the frequency of the AC generating circuit is not limited to the resonance frequency, and any frequency can be selected so that the current gains are uniform. Alternatively, it is possible to adjust the amount of the current by setting an arbitrary frequency. That is, by varying an oscillatory frequency of the AC generating circuit depending on the transfer characteristics of the AC circuit formed between the selected two cell modules, the voltages of the charging currents of the cell modules can be uniformed.

That is, the power supplying apparatus in accordance with the second embodiment of the present invention includes the plurality of cell modules connected in series, each of the plurality of cell modules includes the rectifying circuits, the AC circuit to sequentially connect the rectifying circuits, and the AC generating circuit to apply an AC voltage to the AC circuit, where the capacitors connected in series are connected to the AC circuit. Also, by varying the frequency of the AC generating circuit depending on the combination of the selected discharged cell module and the charged cell module, the amount of the charging current can be uniformed.

Seventh Embodiment

Figure 19:
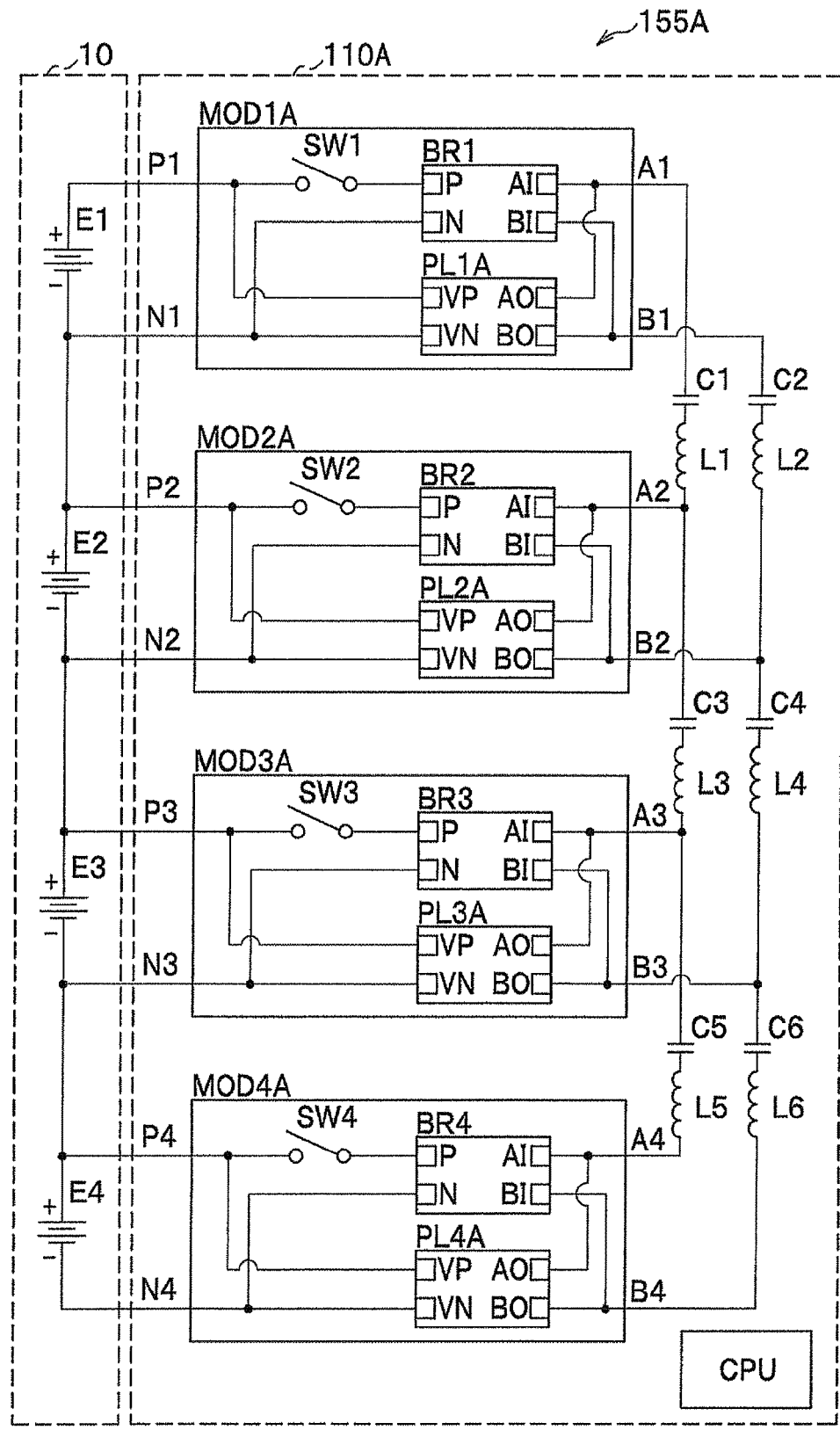
FIG. 19 shows a block diagram of the power supplying system in accordance with the second embodiment of the present invention.
Figure 20:
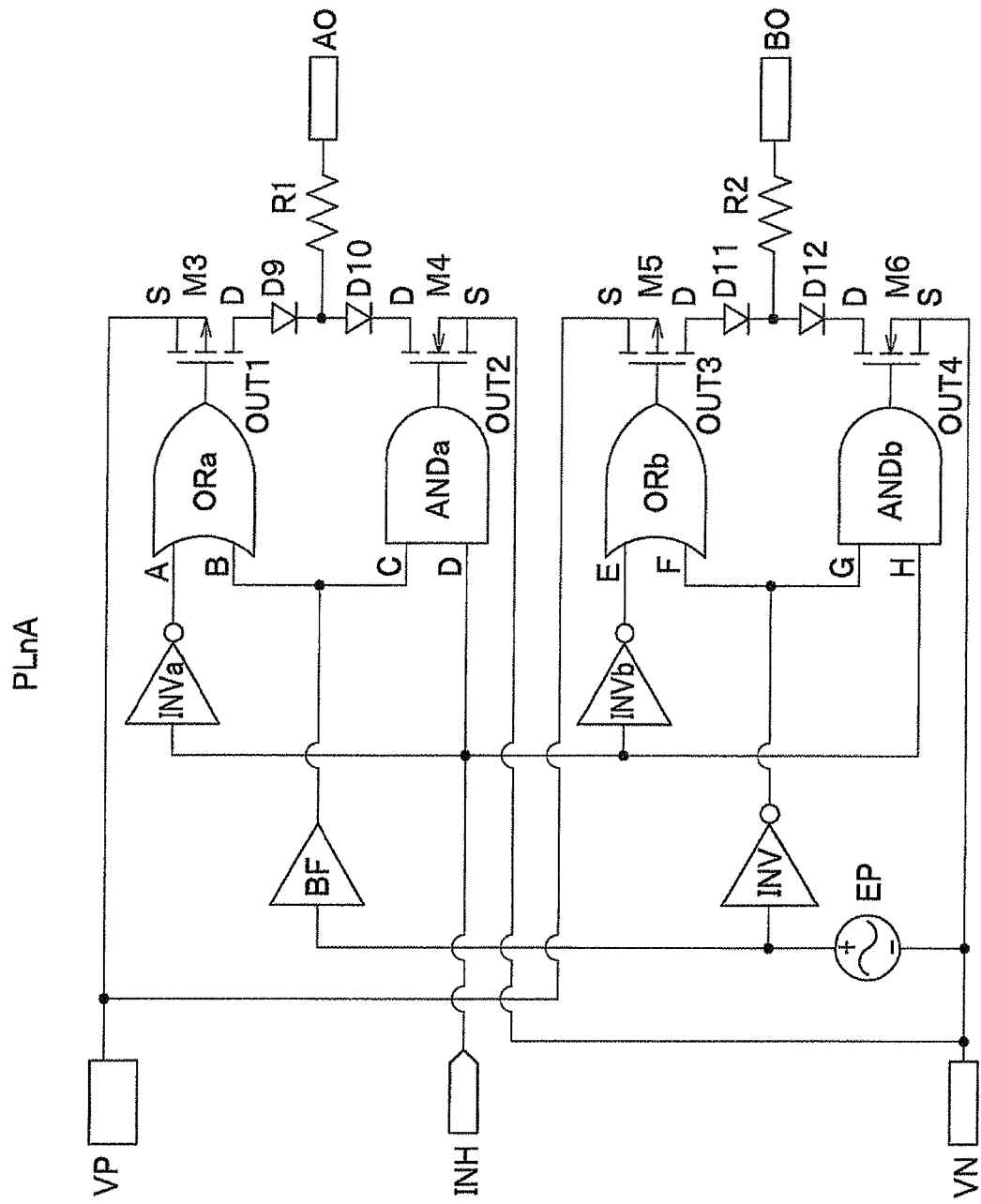
FIG. 20 shows a circuit diagram of an AC generating circuit used for the power supplying system shown in FIG. 19.

FIG. 19 shows a block diagram of a power supplying system 155A in accordance with the second embodiment of the present invention, and FIG. 20 shows a circuit diagram of an AC generating circuit PLnA used for the power supplying system 155A shown in FIG. 19. That is, in the power supplying apparatus 110A of the second embodiment, the series circuit composed of the capacitors C in the power supplying apparatus 110 shown in FIG. 4 is replaced by a series circuit composed of the capacitor C and inductor L shown in FIG. 19, and the inductors L1 and L2 at an output stage of the AC generating circuit PLn shown in FIG. 3 are replaced by resistors R1 and R2. Because charging currents of the cell modules can be uniformed by such a circuitry, operating principles will be explained in detail.

Also, the capacitor C1 and the inductor L1 are connected between the controlling terminal A1 and the controlling terminal A2, the capacitor C2 and the inductor L2 are connected between the controlling terminal B1 and the controlling terminal B2, the capacitor C3 and the inductor L3 are connected between the controlling terminal A2 and the controlling terminal A3, the capacitor C4 and the inductor L4 are connected between the controlling terminal B2 and the controlling terminal B3, the capacitor C5 and the inductor L5 are connected between the controlling terminal A3 and the controlling terminal A4, and the capacitor C6 and the inductor L6 are connected between the controlling terminal B3 and the controlling terminal B4 so as to configure the AC circuit. That is, the power supplying system 155A shown FIG. 19 is a circuit diagram of the power supplying system in which three capacitors C1, C3, and C5 and three inductors L1, L3, and L5 are connected in series in one system, and three capacitors C2, C4, and C6 and three inductors L2, L4, and L6 are connected in series in another system. In addition, the plurality of loads in this embodiment are the cell modules E1, E2, E3, and E4.

Here, the cases where the cell module E1 at the highest stage, the cell module E2 at the second stage, and the cell module E3 at the third stage are charged from the AC generating circuit PL4A connected to the controlling module MOD4A of the cell module E4 at the lowest stage in the power supplying apparatus 110A of the second embodiment shown in FIG. 19 will be explained.

Figure 21:
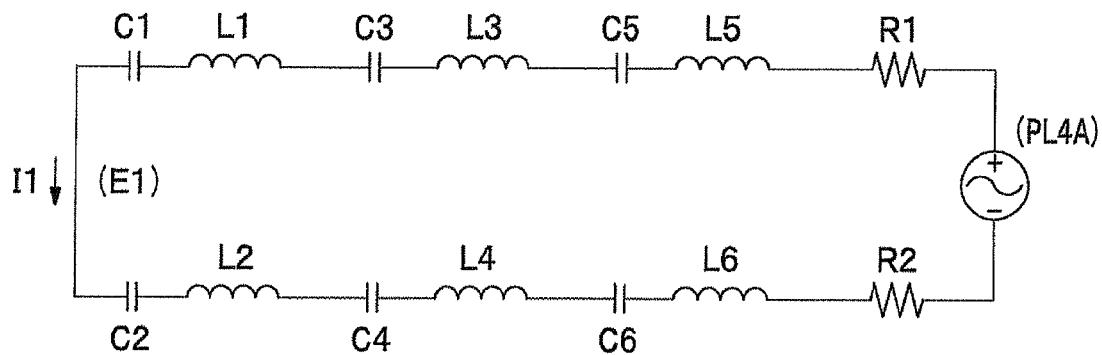
FIG. 21 shows an equivalent circuit in the case where only AC component is considered when cell modules E4-E1 are charged in the power supplying apparatus shown in FIG. 19.
Figure 22:
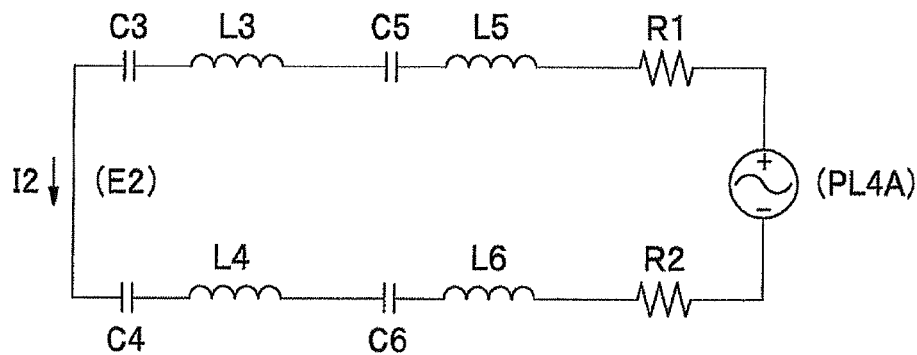
FIG. 22 shows an equivalent circuit in the case where only AC component is considered when cell modules E4-E2 are charged in the power supplying apparatus shown in FIG. 19.
Figure 23:
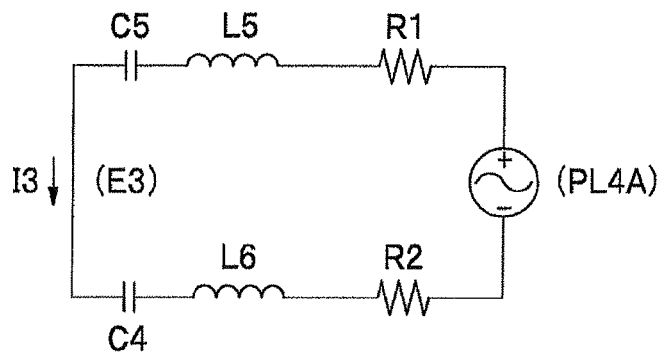
FIG. 23 shows an equivalent circuit in the case where only AC component is considered when cell modules E4-E3 are charged in the power supplying apparatus shown in FIG. 19.

FIG. 21 shows an equivalent circuit in the case where only AC component is considered when cell modules E4-E1 are charged in the power supplying apparatus 110A shown in FIG. 19, and FIG. 22 shows an equivalent circuit in the case where only AC component is considered when cell modules E4-E2 are charged in the power supplying apparatus 110A shown in FIG. 19. Further, FIG. 23 shows an equivalent circuit in the case where only AC component is considered when cell modules E4-E3 are charged in the power supplying apparatus shown in FIG. 19. Also, FIG. 24 shows frequency characteristics of a current gain of each of the equivalent circuits shown in FIG. 21, FIG. 22, and FIG. 23, where the horizontal axis represents a frequency and the vertical axis represents a current gain.

That is, FIG. 21 shows a simplified AC equivalent circuit where the cell module E1 at the highest stage is charged from the AC generating circuit PL4A of the cell module E4 at the lowest stage, FIG. 22 shows an equivalent circuit where the cell module E2 at the second stage is charged from the same AC generating circuit PL4A, and FIG. 23 shows an equivalent circuit where the cell module E3 at the third stage is charged from the same AC generating circuit PL4A. LC series resonance circuits having difference number of stages are formed.

Figure 24:
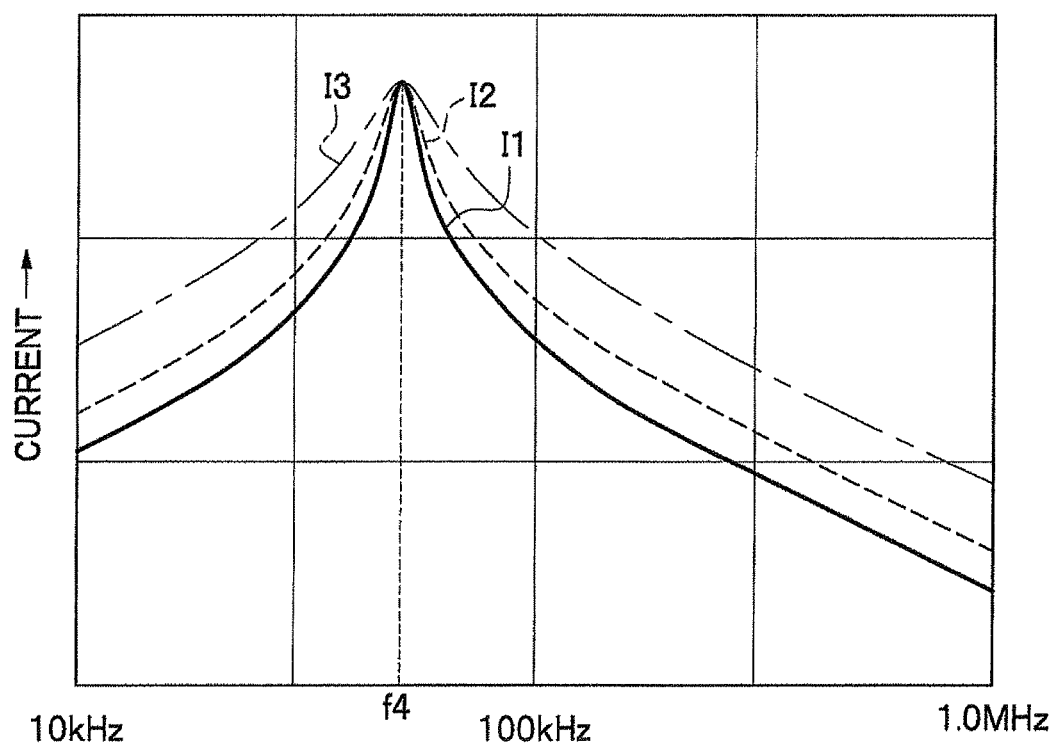
FIG. 24 shows frequency characteristics of a current gain of each of the equivalent circuits shown in FIG. 21, FIG. 22, and FIG. 23.

By such LC resonance circuits, as shown in FIG. 24, the frequency characteristics of the current gain of each of the equivalent circuits shown in FIG. 21, FIG. 22, and FIG. 23 show that resonance frequencies f4 which show peak values of the charging currents are the same, and that attenuation characteristics of the current gains are different. That is, in any equivalent circuit shown in FIG. 21, FIG. 22, and FIG. 23, peak values of the charging currents I1, I2, and I3 are approximately the same at the same resonance frequency of the AC generating circuit PL4A. For this reason, because a charging/discharging current having the same value is allowed to flow through the charging/discharging route in any combination of cell modules by setting resonance frequencies of the AC generating circuits of the cell modules at the same value, charging voltage of the cell modules can be uniformed.

In addition, FIG. 24 shows frequency characteristics of the current gains of equivalent circuits (i.e., the equivalent circuits shown in FIG. 21, FIG. 22, and FIG. 23) where all capacitances of the capacitors are 1 μF, a resistance value of R1 and R2 is 1Ω, an inductance of the inductor L is 10 μH, and a DC resistance component is negligible compared to the resistance value of R1 and R2. As will be appreciated from FIG. 24, although Q values of the equivalent circuits differ from one another, the resonance frequencies are uniform (i.e., f4=50.35 kHz). Therefore, by equalizing the frequency of the AC generating circuit of each of the cell modules with the resonance frequency, a constant charging/discharging current values can be supplied regardless of selection of the discharged cell modules and charged cell modules.

That is, the power supplying apparatus in accordance with the seventh embodiment includes a plurality of cell modules connected in series, each of the plurality of cell modules includes the rectifying circuit, the AC circuit to sequentially connect between the rectifying circuits, and the AC generating circuit to apply an AC voltage to the AC circuit, where the capacitors and inductors connected in series are connected to the AC circuit. Also, products of equivalent capacitances of a plurality of capacitors C and equivalent inductances of a plurality of inductors L from the AC generating circuits to the rectifying circuits are set to be the same in any combination of the cell modules. Also, the AC circuit is configured to transmit two or more phases alternating currents, and the AC generating circuit is configured to generate an alternating current having a frequency which approximates to a resonance frequency of a series circuit of the capacitor C and the inductor L. For this reason, because the resonance frequencies are the same in any combination of the cell modules, the charging currents having the same value are supplied to all of the cell modules.

Eighth Embodiment

Although a configuration of a power supplying apparatus in accordance with an eighth embodiment is basically the same as that of the power supplying apparatus 110A in accordance with the seventh embodiment shown in FIG. 19, series resistance components in each of the inductors L and capacitors C are not negligible in the eighth embodiment. For this reason, in the power supplying apparatus of the eighth embodiment, the case in which resistance components r1-r6 is placed in each of the LC series circuits will be explained.

Figure 25:
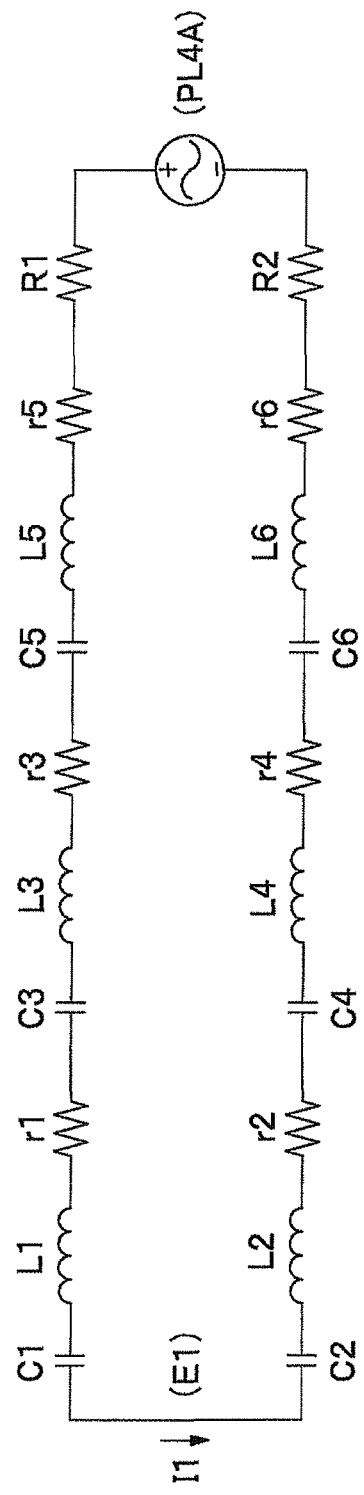
FIG. 25 shows an equivalent circuit in the case where only AC component is considered when cell modules E4-E1 are charged in a power supplying apparatus in accordance with an eighth embodiment of the present invention.
Figure 26:
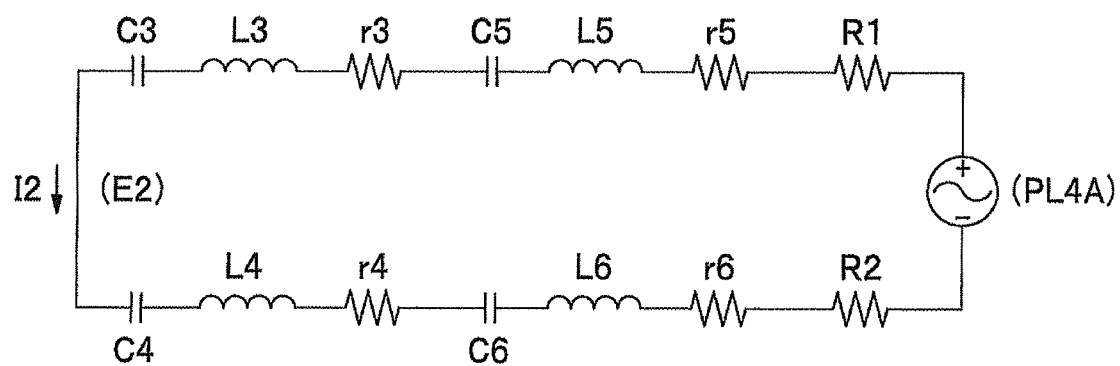
FIG. 26 shows an equivalent circuit in the case where only AC component is considered when cell modules E4-E2 are charged in the power supplying apparatus in accordance with the eighth embodiment of the present invention.
Figure 27:
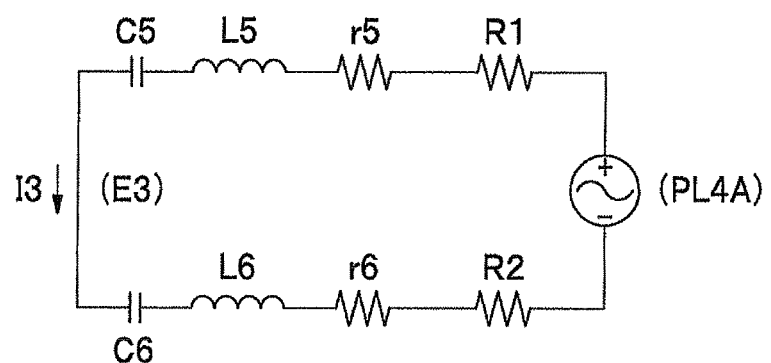
FIG. 27 shows an equivalent circuit in the case where only AC component is considered when cell modules E4-E3 are charged in the power supplying apparatus in accordance with the eighth embodiment of the present invention.

FIG. 25 shows an equivalent circuit in the case where only AC component is considered when cell modules E4-E1 are charged in a power supplying apparatus in accordance with an eighth embodiment of the present invention, and FIG. 26 shows an equivalent circuit in the case where only AC component is considered when cell modules E4-E2 are charged in the power supplying apparatus in accordance with the eighth embodiment of the present invention. Further, FIG. 27 shows an equivalent circuit in the case where only AC component is considered when cell modules E4-E3 are charged in the power supplying apparatus in accordance with the eighth embodiment of the present invention. Also, FIG. 28 shows frequency characteristics of a current gain of each of the equivalent circuits shown in FIG. 25, FIG. 26, and FIG. 27, where the horizontal axis represents a frequency and the vertical axis represents a current gain.

Figure 28:
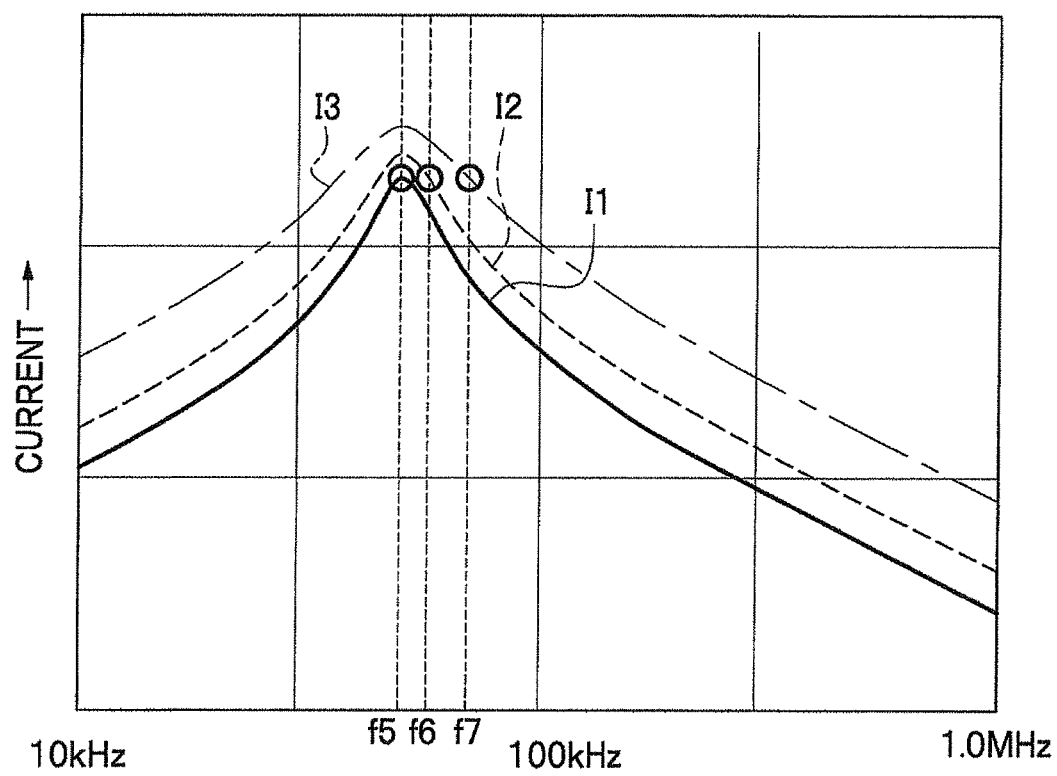
FIG. 28 shows frequency characteristics of a current gain of each of the equivalent circuits shown in FIG. 25, FIG. 26, and FIG. 27.

Referring to the frequency characteristics of the current gain of the equivalent circuit shown in FIG. 28, when the cell modules E4-E1 are charged, the current gain of the charging current I1 decreases most because all of the LC resistance components r1-r6 are inserted in series as shown in the equivalent circuit shown in FIG. 25. Also, when the cell modules E4-E2 is charged, the current gain of the charging current I2 increases little more than the charging current I1 because the LC resistance components r3-r6 are inserted in series as shown in the equivalent circuit shown in FIG. 26. Further, when the cell modules E4-E3 are charged, the current gain of the charging current I3 further increases than the charging current I2 because the only LC resistance components r5-r6 are inserted in series as shown in the equivalent circuit shown in FIG. 27. In addition, the resonance frequencies which mean the peak values of the charging currents I1, I2, and I3 are the same at any equivalent circuit.

FIG. 28 shows frequency characteristics of the current gain where each of the capacitances of the capacitors is 1 μF, and each of the inductances of the inductors L is 10 μH like the seventh embodiment, and a resistance value of the series resistance components r1-r6 is 0.5 Ωunlike the seventh embodiment. That is, when the LC has the series resistance component, the frequency characteristics of the current gains of the equivalent circuits shown in FIG. 25, FIG. 26, and FIG. 27 become like FIG. 28. As shown in FIG. 28, when the series resistance component r of the LC is not negligible, the current gain decreases. Because the more the number of stages between the discharged cell module and the charged cell module, the more the series resistance component r.

For this reason, by adjusting the frequency of the AC generating circuit PL4A depending on the number of stages of the inductors L and capacitors C between the discharged cell module and the charged cell module, a constant charging/discharging current values can be supplied regardless of selection of the discharged cell modules and charged cell modules. That is, as shown in FIG. 28, the frequency of the AC generating circuit PL4A is adjusted to f5 in the case of the charging current I1 (the equivalent circuit shown in FIG. 25) to charge the cell modules E4-E1, the frequency of the AC generating circuit PL4A is adjusted to f6 in the case of the charging current I2 (the equivalent circuit shown in FIG. 26) to charge the cell modules E4-E2, and the frequency of the AC generating circuit PL4A is adjusted to f7 in the case of the charging current I3 (the equivalent circuit shown in FIG. 27) to charge the cell modules E4-E3. For this reason, a constant charging current value can be supplied regardless of selection of the cell modules.

That is, the power supplying apparatus in accordance with the eighth embodiment includes the plurality of cell modules connected in series, each of the plurality of cell modules includes the rectifying circuits, the AC circuit to sequentially connect between the rectifying circuits, and the AC generating circuit to apply an AC voltage to the AC circuit, where when the AC generating circuit generates an alternating current having a frequency which approximates to the resonance frequency of the series LC circuit and amplitudes of input voltages the rectifying circuits have deviations, the AC generating circuit adjusts the frequency of the generated AC voltage to keep the amplitude of the input voltages constant.

Ninth Embodiment

In the second embodiment, the bridge-type full-wave rectifying circuit shown in FIG. 5 is used as the rectifying circuit BRn of the power supplying apparatus 110. However, when the voltages of the cell modules approximately equal to one another, a power supply voltage of the AC generating circuit PLn of the discharged cell modules is approximately equal to a voltage of a charged load (charged cell module) connected to the rectifying circuit BRn of the charged cell modules, a voltage drop, etc. occurs at the diode of the rectifying circuit BRn, thereby preventing charging from the discharged cell module to the charged cell module.

That is, in the power supplying apparatus 110 shown in FIG. 4, when a deviation of the charging voltages of the cell modules E1, E2, E3, and E4 is small, for example, if charging is performed from the cell module E4 having high charging voltage to the cell module E1 having low charging voltage using the bridge-type rectifying circuit BRn shown in FIG. 5, the cell modules E4-E1 can not be charged due to a forward voltage drop of the diode of the rectifying circuit BRn. For this reason, in order to solve such a problem, the cell module E1 is charged by increasing the voltage of the cell module E4. That is, a step-up rectifying circuit is used as the rectifying circuit of the cell module E4, and the cell module E1 is charged by a charge pump operation.

Figure 29:
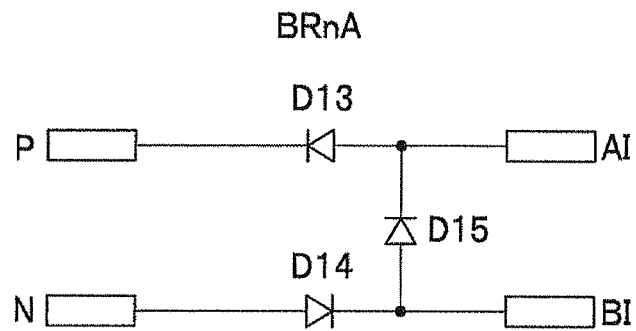
FIG. 29 shows a circuit diagram of a standard voltage-doubler rectifying circuit.

FIG. 29 shows a circuit diagram of a standard voltage-doubler rectifying circuit BRnA. In such a voltage-doubler rectifying circuit BRnA shown in FIG. 29, when AC voltages are applied to the AI and BI terminals, charging is performed in a path AI→D13→P→load (capacitor)→N→D14→BI in a positive half cycle, and an electric energy supplied from the terminal B1 is additionally charged to the load (capacitor) in a path D15→D13→P→load (capacitor)→N→D14→D15 in a negative half cycle. As a result, two times the AC voltage is applied to the load (capacitor). Therefore, by replacing the bridge-type rectifying circuit BRn shown in FIG. 5 with the voltage-doubler rectifying circuit BRnA shown in FIG. 29 and adding a step-up function, it becomes possible to charge from the discharged cell modules to the charged cell modules even if the voltages of the cell modules are approximately equal to one another. For example, by doubling the voltage of the cell module E4 using the voltage-doubler rectifying circuit BRnA shown in FIG. 29, the cell modules E4-E1 can be charged.

However, because an output voltage of the rectifying circuit becomes approximately double the voltage amplitude of the AC circuit when the voltage-doubler rectifying circuit BRnA is used, an excessive charging current may be allowed to flow into the charged cell module. For this reason, in order to suppress the excessive charging current, a resistance value of the resistor inserted to the charging circuit in series may be increased. However, increasing the resistance value of the charging circuit is undesired because a power loss is increased. For this reason, a method to suppress the excessive charging current without increasing the resistance value of the charging circuit in the case where the voltage-doubler rectifying circuit BRnA is used will be explained.

Figure 30:
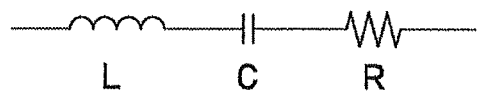
FIG. 30 shows a circuit diagram of a series LCR circuit connected to a charging/discharging circuit of a power supplying apparatus in accordance with a ninth embodiment of the present invention.

FIG. 30 shows a circuit diagram of a series LCR circuit connected to a charging/discharging circuit of a power supplying apparatus in accordance with a ninth embodiment. An impedance Z of a series LCR circuit shown in FIG. 30 is expressed by Eq. (1), $$|Z| = R \cdot \frac{Q \cdot b}{\omega} \cdot \sqrt{1 + \left(\frac{1}{Q^2} - 2\right) \cdot \left(\frac{\omega}{b}\right)^2 + \left(\frac{\omega}{b}\right)^4} \quad (1)$$

where b is expressed by Eq. (2), and Q is expressed by Eq. (3). In addition, L represents an inductance, C represents a capacitance, and R represents a resistance value in the following equations.

$$b = \sqrt{\frac{1}{L \cdot C}} \quad (2)$$

$$Q = \frac{1}{R} \cdot \sqrt{\frac{L}{C}} \quad (3)$$

Here, substituting Eq. (2) and Eq. (3) into Eq. (1) and yields Eq. (4).

$$|Z| = \sqrt{\frac{1}{C^2 \omega^2} + \left(R^2 - 2 \cdot \frac{L}{C}\right) + L^2 \omega^2} \quad (4)$$

Figure 31:
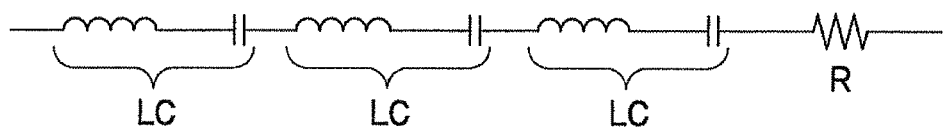
FIG. 31 shows a multistage circuit diagram of a series LC circuit connected to a charging/discharging circuit of the power supplying apparatus in accordance with the fourth embodiment of the present invention.

Here, a configuration in which the combination of L and C shown in the second embodiment connected multistage will be explained. FIG. 31 shows a multistage circuit diagram of a series LC circuit connected to a charging/discharging circuit of the power supplying apparatus in accordance with the fourth embodiment of the present invention. That is, is the configuration in which the combination of L and C is connected multistage as shown in FIG. 31, assume that the number of multistage of the combination of L and C is n, L is replaced by nL and C is replaced by C/n. Therefore, the impedance Z of the multistage combination of L and C is expressed by Eq. (5).

$$|Z| = \sqrt{\frac{n^2}{C^2 \omega^2} + \left(R^2 - 2 \cdot n^2 \cdot \frac{L}{C}\right) + n^2 L^2 \omega^2} \quad (5)$$

Here, when b of Eq. (2) which represents the resonance frequency is constant regardless of n, and s frequency ω is equal to b (resonance frequency), the impedance Z is equal to the resistance value of the resistor R regardless of n. That is, when the frequency of the AC generating circuit becomes the resonance frequency, a multistage series LC circuit shown in FIG. 31 has only component of the resistor R.

Figure 32:
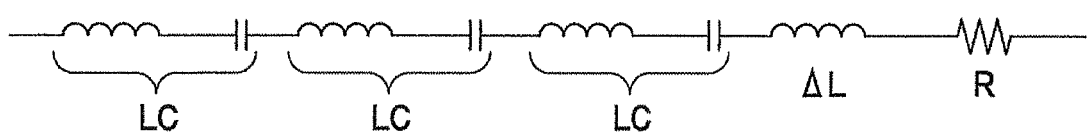
FIG. 32 shows a circuit diagram of the multistage series LC circuit shown in FIG. 31 and added inductor $\Delta L$.

Here, the case in which an inductor ΔL is added to the multistage series LC circuit shown in FIG. 31 will be explained. FIG. 32 shows a circuit diagram of the multistage series LC circuit shown in FIG. 31 and added inductor ΔL. When the inductor ΔL is added to the multistage series LC circuit shown in FIG. 32, nL in Eq. (5) is replaced by (nL+ΔL). Therefore, the impedance Z is expressed by Eq. (7).

$$\omega = \sqrt{\frac{1}{L \cdot C}} \quad (6)$$

$$|Z| = \sqrt{\frac{n^2}{C^2 \omega^2} + \left(R^2 - 2 \cdot n \cdot \frac{(n \cdot L + \Delta L)}{C}\right) + (n \cdot L + \Delta L)^2 \omega^2} \quad (7)$$

Here, because the frequency ω is expressed by Eq. (6), Eq. (7) is expressed by Eq. (8).

$$|Z| = \sqrt{\frac{n^2}{C^2} \cdot L \cdot C + \left(R^2 - 2 \cdot n \cdot \frac{(n \cdot L + \Delta L)}{C}\right) + (n \cdot L + \Delta L)^2 \cdot \frac{1}{L \cdot C}} \quad (8)$$

$$= \sqrt{R^2 + \frac{\Delta L^2}{L \cdot C}}$$

That is, because the impedance Z is expressed by Eq. (8) when the frequency ω is expressed by Eq. (7), the impedance Z is constant regardless of the number n of multistage of the LC.

Figure 33:
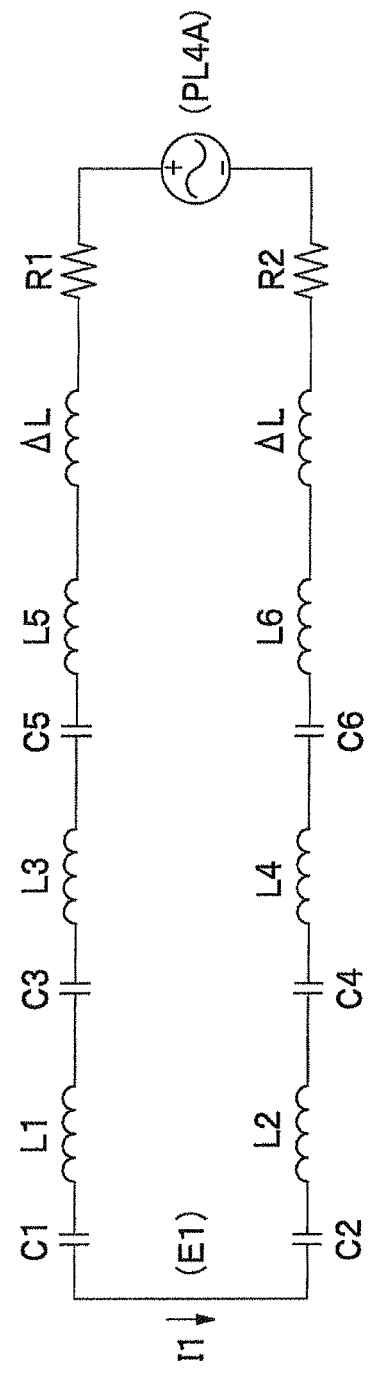
FIG. 33 shows an equivalent circuit of the multistage series LC circuit shown in FIG. 21 and added inductors $\Delta L$.
Figure 34:
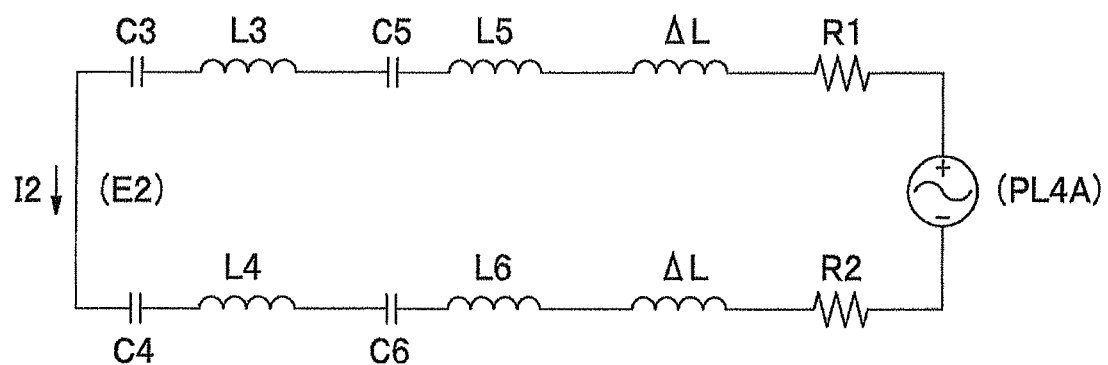
FIG. 34 shows an equivalent circuit of the multistage series LC circuit shown in FIG. 22 and added inductors $\Delta L$.
Figure 35:
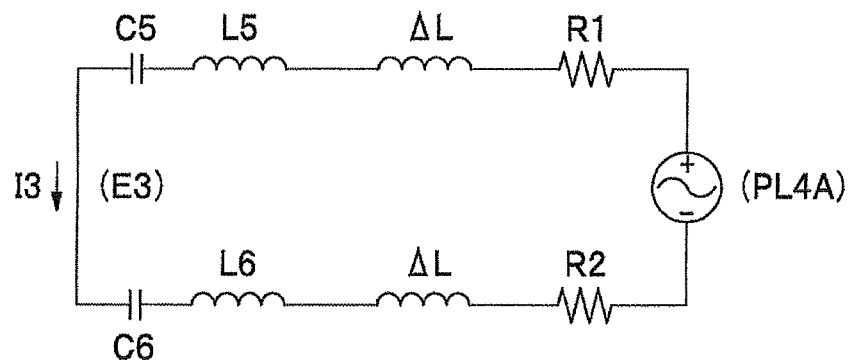
FIG. 35 shows an equivalent circuit of the multistage series LC circuit shown in FIG. 23 and added inductors $\Delta L$.

Here, configurations in which an inductor ΔL is added to equivalent circuits of the multistage series LC circuits shown in FIG. 21, FIG. 22, and FIG. 23 will be explained. FIG. 33 shows an equivalent circuit of the multistage series LC circuit shown in FIG. 21 and added inductors ΔL, FIG. 34 shows an equivalent circuit of the multistage series LC circuit shown in FIG. 22 and added inductors ΔL, and FIG. 35 shows an equivalent circuit of the multistage series LC circuit shown in FIG. 23 and added inductors ΔL. Also, FIG. 36 shows frequency characteristics of a current gain of each of the equivalent circuits shown in FIG. 33, FIG. 34, and FIG. 35, where the horizontal axis represents a frequency and the vertical axis represents a current gain.

Figure 36:
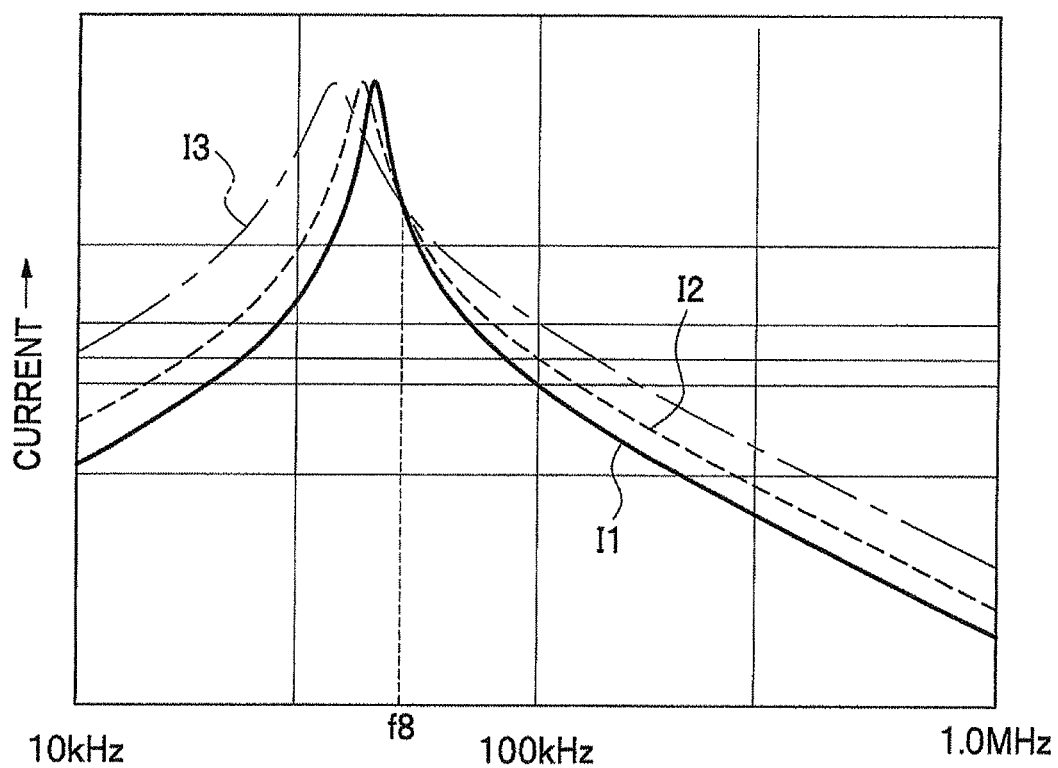
FIG. 36 shows frequency characteristics of a current gain of each of the equivalent circuits shown in FIG. 33, FIG. 34, and FIG. 35.

That is, by adding inductors ΔL to the series LC circuits shown in FIG. 21, FIG. 22, and FIG. 23 respectively so as to obtain the equivalent circuits shown in FIG. 33, FIG. 34, and FIG. 35, it is found that, as shown in FIG. 36, a frequency f8, at which the resonance frequencies of the equivalent circuits differ from one another but the current gains (amplitudes) of the charging currents I1, I2, and I3 are equal to one another, exists. For example, when the value of the added inductor ΔL is set to 10 μH which is the same as those of L1-L6, the frequency characteristics of the equivalent circuits shown in FIG. 33, FIG. 34, and FIG. 35 indicates that, as shown in FIG. 36, a frequency f8, at which the resonance frequencies of the equivalent circuits differ from one another but the current amplitudes are equal to one another, exists. At this time, the frequency f8 is equal to the resonance frequency (50.35 kHz) before the inductor ΔL is added.

Figure 37:
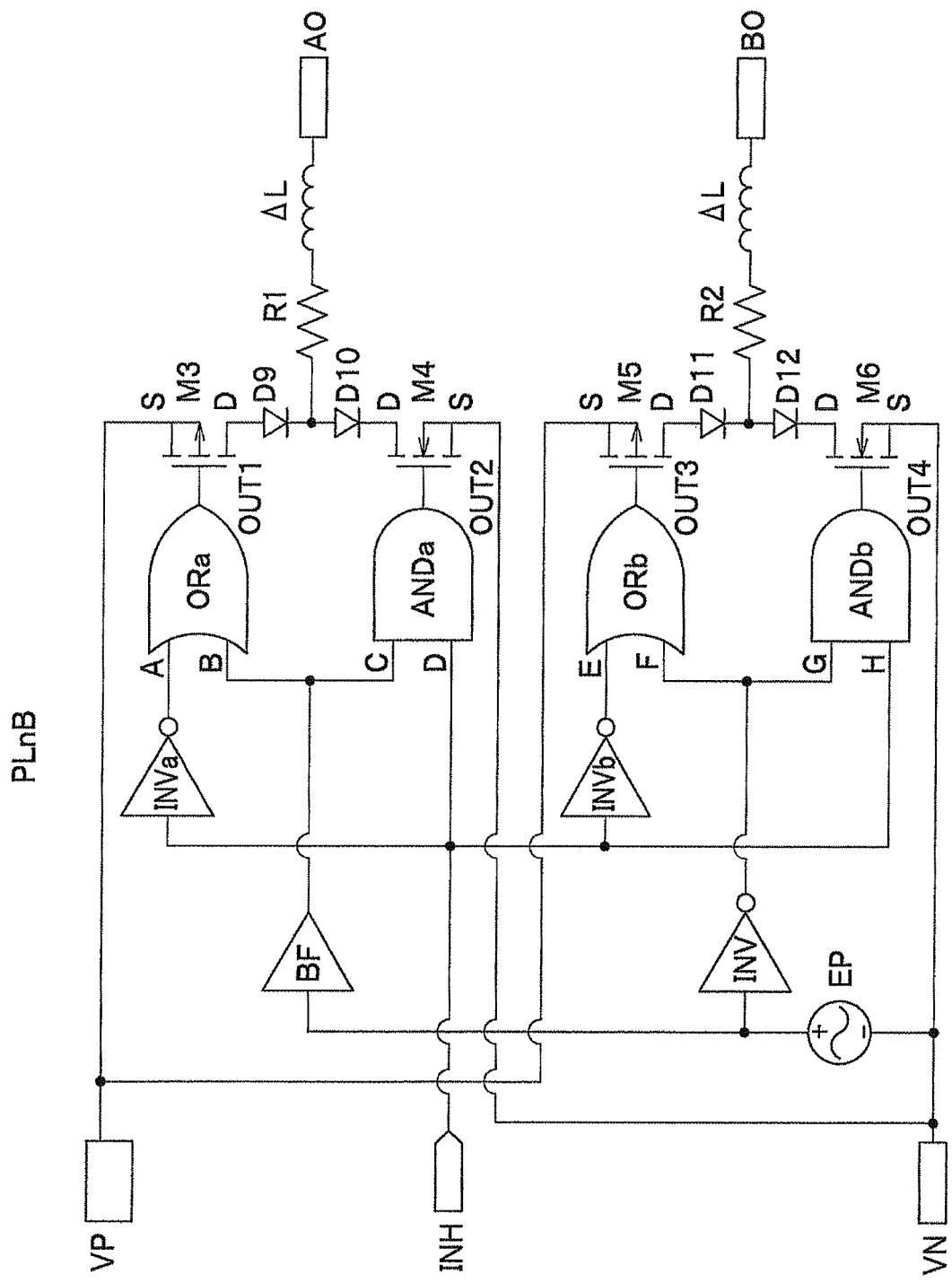
FIG. 37 shows an AC generating circuit of the fourth embodiment in which inductors $\Delta L$ are added to the AC generating circuit shown in FIG. 20.
Figure 38:
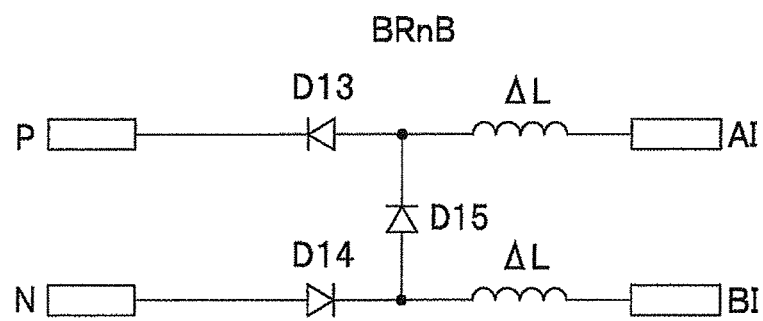
FIG. 38 shows a voltage-doubler rectifying circuit of the fourth embodiment in which inductors $\Delta L$ are added to the voltage-doubler rectifying circuit shown in FIG. 29.

FIG. 37 shows an AC generating circuit PLnB of the fourth embodiment in which inductors ΔL (first inductor) are added to the AC generating circuit PLnA shown in FIG. 20, and FIG. 38 shows a voltage-doubler rectifying circuit BRnB of the ninth embodiment in which inductors ΔL (second inductor) are added to the voltage-doubler rectifying circuit BRnA shown in FIG. 29. That is, compared to the configurations of the power supplying apparatus 110A shown in FIG. 1, the AC generating circuit PLnA shown in FIG. 20, and the voltage-doubler rectifying circuit BRnA shown in FIG. 29, the inductor ΔL is added to the AC generating circuit PLnA shown in FIG. 20 so as to obtain the AC generating circuit BRnB shown in FIG. 37. As a result, an excessive charging current caused by the voltage-doubler rectifying circuit BRnB can be suppressed while gain characteristics between the stages of LC in the cell module are kept uniform without increasing a resistance loss. In addition, if the voltage-doubler rectifying circuit BRnB suppresses the excessive charging current enough, current limiting resistors R1 and R2 shown in FIG. 37 may be omitted. Also, not only the AC generating circuit PLnB to which the inductor ΔL is added as shown in FIG. 37, but also the voltage-doubler rectifying circuit BRnB to which the inductor ΔL is added as shown in FIG. 38, can suppress the excessive charging current caused by the voltage-doubler rectifying circuit.

Figure 39:
FIG. 39 shows a circuit diagram of the series LC circuit and inductor $\Delta L$ shown in FIG. 32 and added series resistance component r of the LC.

Next, as shown in equivalent circuits of the third embodiment shown in FIG. 25, FIG. 26, and FIG. 27, the case in which an equivalent series resistor r of the L and C which connect between stages is not negligible will be explained. FIG. 39 shows a circuit diagram of the series LC circuit and inductor ΔL shown in FIG. 32 and added series resistance component r of the LC.

The impedance Z of the circuit shown in FIG. 39 is expressed by Eq. (9).

$$|Z| = \sqrt{\frac{n^2}{C^2 \omega^2} + \left((R + n \cdot r)^2 - 2 \cdot n \cdot \frac{(n \cdot L + \Delta L)}{C}\right) + (n \cdot L + \Delta L)^2 \omega^2} \quad (9)$$

Here, when the frequency ω is expressed by Eq. (7), the impedance Z is expressed by Eq. (10).

$$|Z| = \sqrt{\frac{n^2}{C^2} \cdot L \cdot C + \left((R + n \cdot r)^2 - 2 \cdot n \cdot \frac{(n \cdot L + \Delta L)}{C}\right) + (n \cdot L + \Delta L)^2 \cdot \frac{1}{L \cdot C}} \quad (10)$$

$$= \sqrt{(R + n \cdot r)^2 + \frac{\Delta L^2}{L \cdot C}}$$

Also, when the inductor ΔL does not exist, the impedance Z is expressed by Eq. (11).

$$|Z| = \sqrt{(R + n \cdot r)^2} \quad (11)$$

That is, because the impedance Z in the case where the inductor ΔL does not exist is expressed by Eq. (11), it is found that the effect of the number n of stages of the inductor L and capacitor C is relatively small in Eq. (10).

Figure 40A:
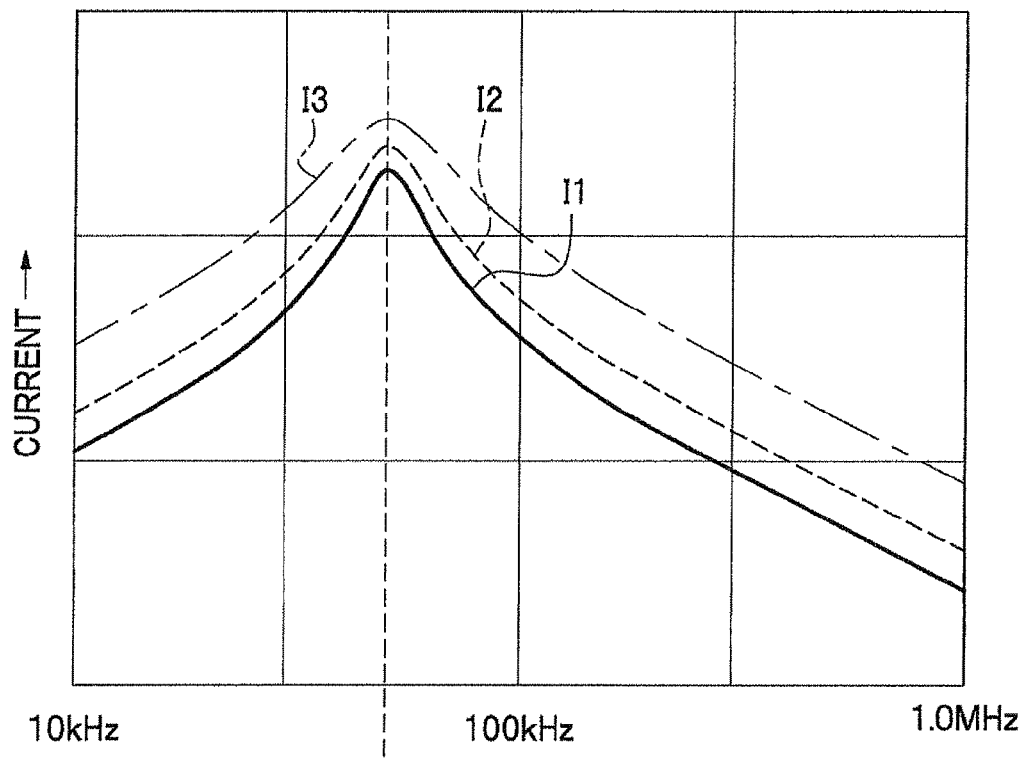
FIG. 40A shows frequency characteristics of a current gain in the case where the inductor $\Delta L$ is not added.
Figure 40B:
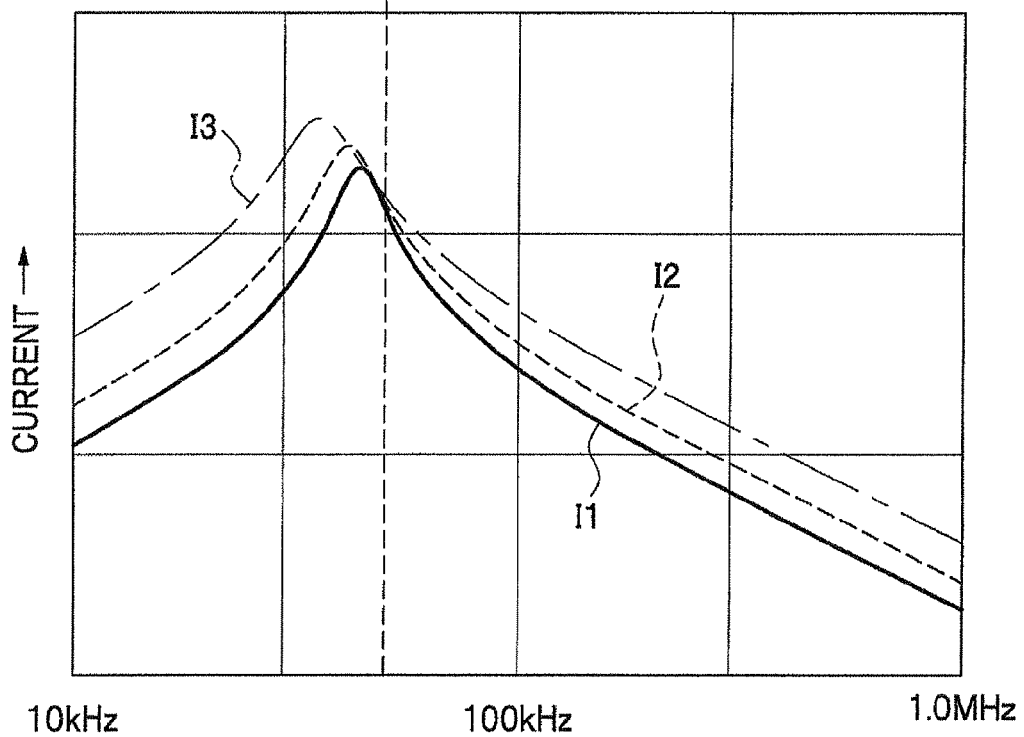
FIG. 40B shows frequency characteristics of a current gain in the case where the inductor $\Delta L$ is added.

FIG. 40A shows frequency characteristics of a current gain in the case where the inductor ΔL is not added, and FIG. 40B shows frequency characteristics of a current gain in the case where the inductor ΔL is added, where the horizontal axis represents a frequency and the vertical axis represents a current gain in both cases. That is, FIG. 40A shows the frequency characteristics of LC equivalent circuits which lack the inductor ΔL as shown in FIG. 25, FIG. 26, and FIG. 27 (i.e., frequency characteristics shown in FIG. 18), and FIG. 40B shows the frequency characteristics of LC equivalent circuits which include the inductor ΔL as shown in FIG. 33, FIG. 34, and FIG. 35 (i.e., frequency characteristics shown in FIG. 36). In addition, FIG. 40B shows the frequency characteristics in the case where the inductor ΔL whose value is 10 μH, which is the same as those of the L1-L6, is added to the equivalent circuits shown in FIG. 25, FIG. 26, and FIG. 27, and compares the frequency characteristics of the LC equivalent circuit (i.e., frequency characteristics shown in FIG. 28) in the case where the inductor ΔL does not exist.

That is, as shown in FIG. 40A, when the inductor ΔL does not exist, peak values of the charging currents of the equivalent circuits differ from one another in the vicinity of the resonance frequency (50.35 kHz). However, as shown in FIG. 40B, when the inductor ΔL exists, the values of the charging currents of the equivalent circuit approximate one another in the vicinity of the resonance frequency (50.35 kHz) in the case where the inductor ΔL does not exist. That is, as will be appreciated from the frequency characteristics shown in FIG.

40, by adding the inductor ΔL, the difference between the charging currents caused by the different number of stages becomes small in the vicinity of the resonance frequency (50.35 kHz) in the case where the inductor ΔL does not exist. Also, the amount of the charging current is suppressed compared to the amount at the time before the inductor ΔL is added.

For this reason, in the case where the voltage-doubler rectifying circuit is used, the excessive charging current can be suppressed by adding the inductor ΔL without increasing the resistance value inserted into the LC circuit in series and the power loss.

That is, in the power supplying apparatus of the ninth embodiment, the AC generating circuit generates an alternating current having a frequency which approximates to the resonance frequency of the series LC circuit, and a inductor is inserted between the AC generating circuit and the AC circuit. As a result, even if the voltage-doubler rectifying circuit is used, the excessive charging current can be suppressed. Also, the excessive charging current can be suppressed even if the inductor is inserted between the AC circuit and the rectifying circuit.

Tenth Embodiment

Figure 41:
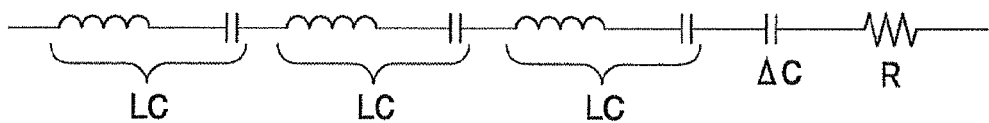
FIG. 41 shows a circuit diagram of the multistage series LC circuit shown in FIG. 31 and an added capacitor $\Delta C$.

In a tenth embodiment, the case in which a capacitor ΔC is added to the series LC circuit instead of the inductor ΔL will be explained. FIG. 41 shows a circuit diagram of the multistage series LC circuit shown in FIG. 31 and an added capacitor ΔC.

Here, like the ninth embodiment in which the inductor ΔL is added to the series LC circuit, an impedance Z of the circuit shown in FIG. 41 in which the capacitor ΔC is added to the series LC circuit will be calculated. When the capacitor ΔC is added to the series LC circuit, C/n in Eq. (5) is replaced by C·ΔC/(nΔC+C). Therefore, the impedance Z is expressed by Eq. (12).

$$|Z| = \sqrt{\frac{(n \cdot \Delta C + C)^2}{C^2 \Delta C^2 \omega^2} + \left(\frac{R^2 - 2 \cdot n \cdot L(n \cdot \Delta C + C)}{C \Delta C}\right) + n^2 L^2 \omega^2} \quad (12)$$

Here, when the frequency ω is expressed by Eq. (7), the impedance Z is calculated by Eq. (13), and the impedance Z is constant regardless of the number n of stages.

$$|Z| = \sqrt{\frac{(n \cdot \Delta C + C)^2}{C^2 \Delta C^2} \cdot L \cdot C + \left(R^2 - 2 \cdot n \cdot \frac{L(n \cdot \Delta C + C)}{C \Delta C}\right) + \frac{n^2 L^2}{L \cdot C}}$$

$$= \sqrt{R^2 + \frac{L \cdot C}{\Delta C^2}} \quad (13)$$

Figure 42:
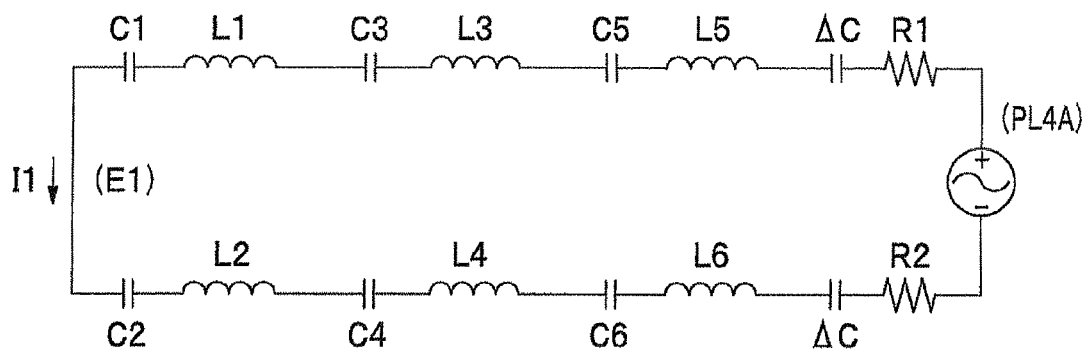
FIG. 42 shows an equivalent circuit of the multistage series LC circuit shown in FIG. 21 and added capacitors $\Delta C$.
Figure 43:
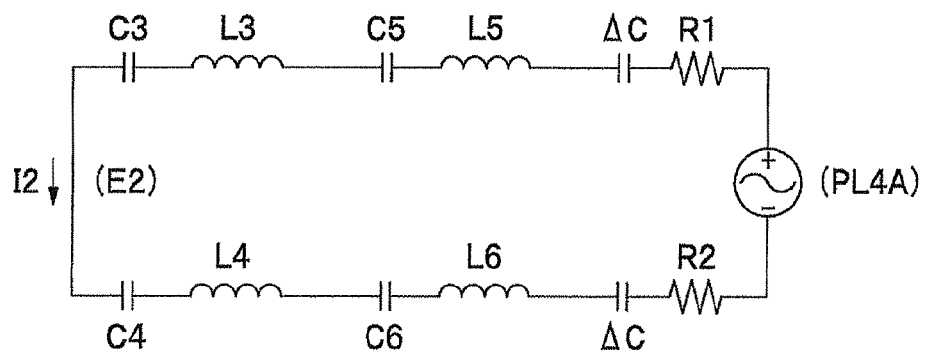
FIG. 43 shows an equivalent circuit of the multistage series LC circuit shown in FIG. 22 and added capacitors $\Delta C$.
Figure 44:
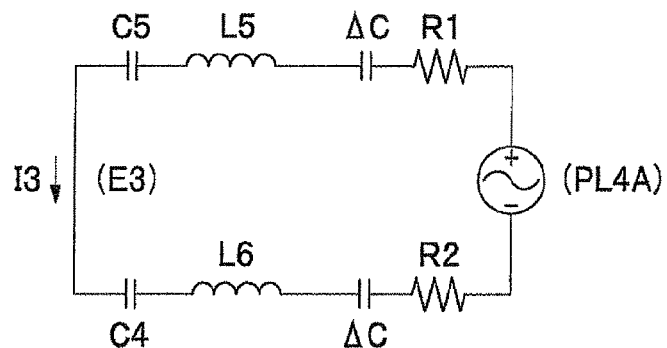
FIG. 44 shows an equivalent circuit of the multistage series LC circuit shown in FIG. 23 and added capacitors $\Delta C$.
Figure 45:
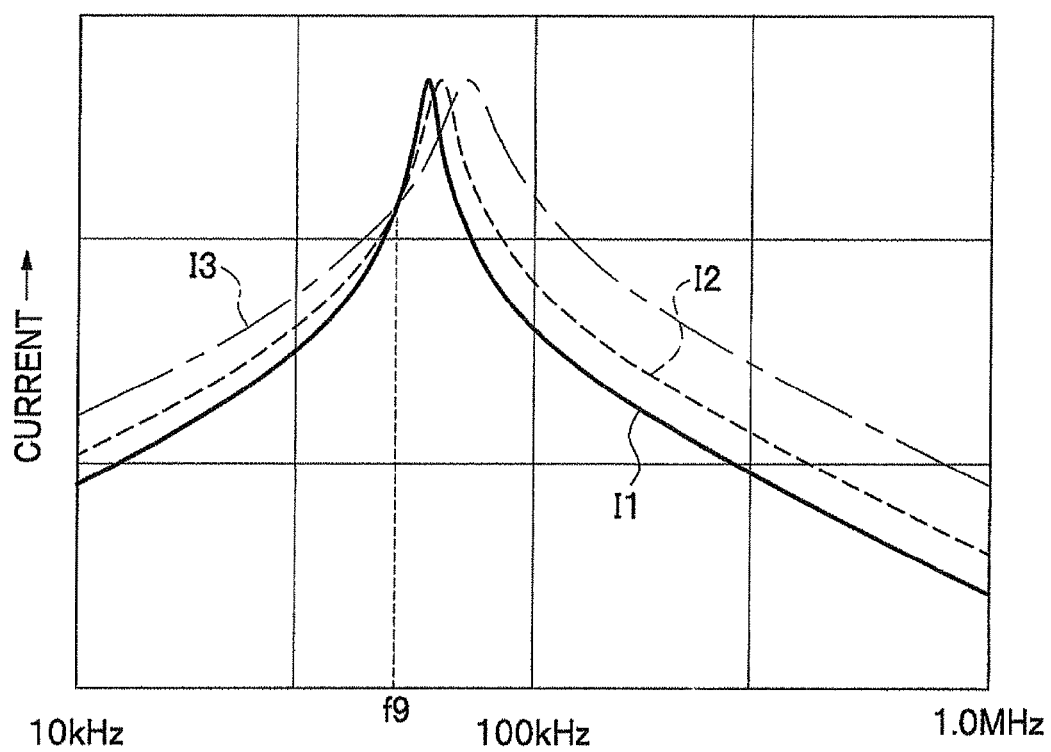
FIG. 45 shows frequency characteristics of a current gain of each of the equivalent circuits shown in FIG. 42, FIG. 43, and FIG. 44.

Next, a configuration in which a capacitor ΔC is added to multistage equivalent circuits of the series LC circuits shown in FIG. 21, FIG. 22, and FIG. 23 will be explained. FIG. 42 shows an equivalent circuit of the multistage series LC circuit shown in FIG. 21 and added capacitors ΔC, FIG. 43 shows an equivalent circuit of the multistage series LC circuit shown in FIG. 22 and added capacitors ΔC, and FIG. 44 shows an equivalent circuit of the multistage series LC circuit shown in FIG. 23 and added capacitors ΔC. Also, FIG. 45 shows frequency characteristics of a current gain of each of the equivalent circuits shown in FIG. 42, FIG. 43, and FIG. 44, where the horizontal axis represents a frequency and the vertical axis represents a current gain.

That is, configurations in which the capacitors ΔC are added to the multistage equivalent circuits of the series LC circuits shown in FIG. 21, FIG. 22, and FIG. 23 are those shown in FIG. 42, FIG. 43, and FIG. 44. When the value of the added capacitor ΔC is 1 μF which is the same as those of C1-C6, the frequency characteristics of the current gains of the equivalent circuits are those shown in FIG. 45. As will be appreciated from frequency characteristics in FIG. 45, a frequency f9, at which the resonance frequencies of the equivalent circuits differ from one another, but current amplitudes of the charging currents I1, I2, and I3 are equal to one another, exists. The frequency f9 is equal to the resonance frequency (50.35 kHz) before the capacitor ΔC is added.

Figure 46:
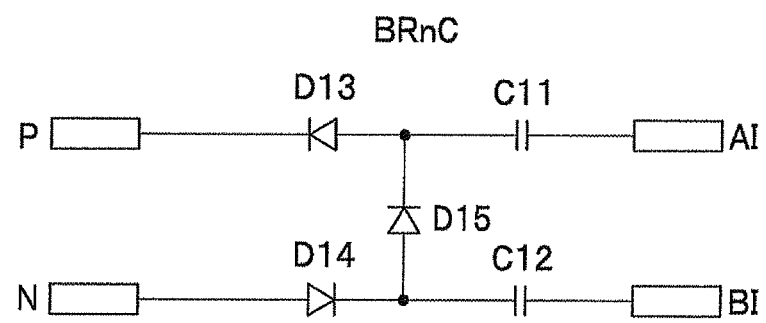
FIG. 46 shows a voltage-doubler rectifying circuit of a tenth embodiment in which capacitors are added to the voltage-doubler rectifying circuit shown in FIG. 29.
Figure 47:
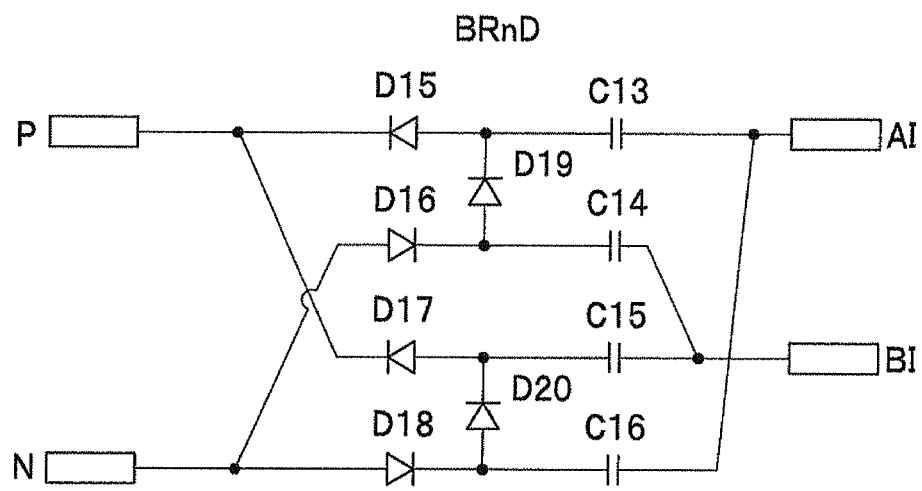
FIG. 47 shows a voltage-doubler rectifying circuit of a fifth embodiment in which capacitors are added to a voltage-doubler rectifying circuit having a different configuration from that shown in FIG. 29.
Figure 48:
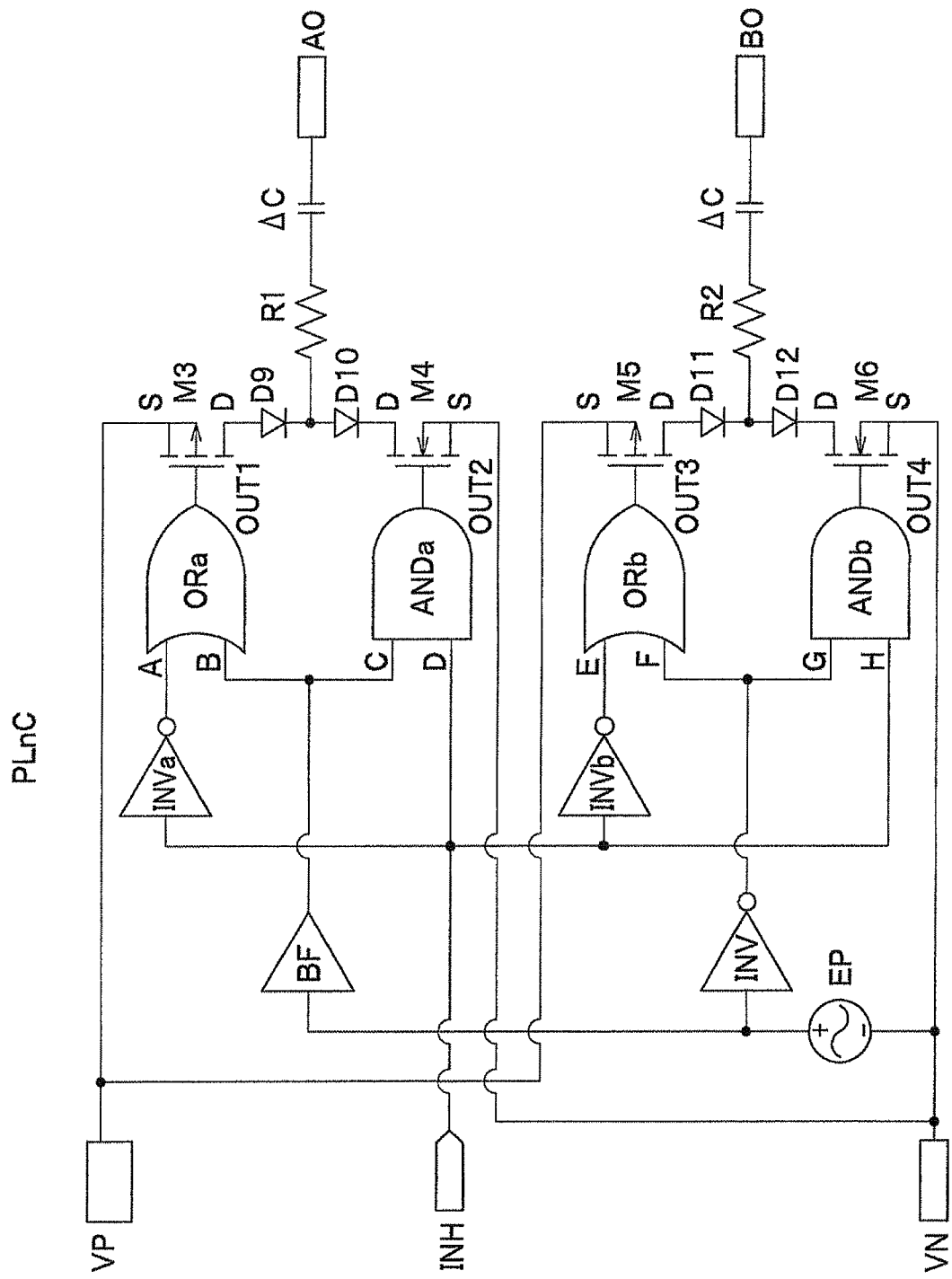
FIG. 48 shows an AC generating circuit of the fifth embodiment in which capacitors $\Delta C$ are added to the AC generating circuit shown in FIG. 20.

FIG. 46 shows a voltage-doubler rectifying circuit BRnC of the tenth embodiment in which capacitors (second capacitor) are added to the voltage-doubler rectifying circuit BRnA shown in FIG. 29, FIG. 47 shows a voltage-doubler rectifying circuit BRnD of the tenth embodiment in which capacitors (second capacitor) are added to the voltage-doubler rectifying circuit having different configuration from that shown in FIG. 29, and FIG. 48 shows an AC generating circuit PLnC of the fifth embodiment in which capacitors AC (first capacitor) are added to the AC generating circuit PLnA shown in FIG. 20.

In the voltage-doubler rectifying circuit BRnC shown in FIG. 46, a capacitor C11 is added between the voltage-doubler rectifying circuit composed of the diodes D13, D14, and D15 and the AI terminal, and a capacitor C12 is added between the voltage-doubler rectifying circuit and the BI terminal.

In the voltage-doubler rectifying circuit BRnD shown in FIG. 47, capacitors C13 and C16 are added between the voltage-doubler rectifying circuit composed of diodes D15, D16, and D19 and diodes D17, D18, and D20 and the AI terminal, and capacitors C14 and C15 are added between the voltage-doubler rectifying circuit and the BI terminal.

That is, compared to the configurations of the power supplying apparatus 110A shown in FIG. 19, the AC generating circuit PLnA shown in FIG. 20, and the voltage-doubler rectifying circuit BRnA shown in FIG. 29, the capacitors AC are added to the AC generating circuit PLnA shown in FIG. 20 so as to obtain the AC generating circuit PLnC shown in FIG. 48. As a result, an excessive charging current caused by the voltage-doubler rectifying circuit can be suppressed while gain characteristic between the cell modules are kept uniform without increasing a resistance loss.

In addition, if the voltage-doubler rectifying circuit suppresses the excessive charging current enough, current limiting resistors R1 and R2 shown in FIG. 48 may be omitted.

Also, not only the AC generating circuit PLnC to which the capacitor ΔC is added as shown in FIG. 48, but also the voltage-doubler rectifying circuit BRnC and voltage-doubler rectifying circuit BRnD to which the capacitor is added as shown in FIGS. 46 and 47, can suppress the excessive charging current caused by the voltage-doubler rectifying circuit.

Figure 49:
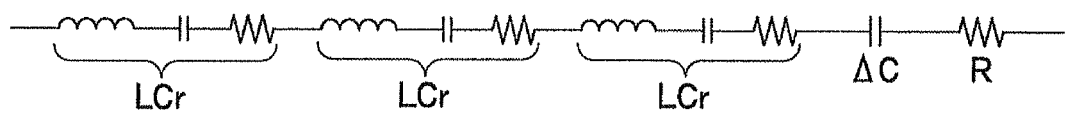
FIG. 49 shows a circuit diagram in which a series resistance component r is added to the series LC circuit shown in FIG. 41.

Next, as shown in the eighth embodiment, the case in which an equivalent series resistor of the L and C which connect between stages is not negligible will be explained. FIG. 49 shows a circuit diagram of the series LC circuit shown in FIG. 41 and added series resistance component r. A impedance Z of the circuit shown in FIG. 49 is expressed by Eq. (14), $$|Z| = \sqrt{\frac{(n \cdot \Delta C + C)^2}{C^2 \Delta C^2 \omega^2} + \left(\frac{(R + n \cdot r)^2 - 2 \cdot n \cdot}{\frac{L(n \cdot \Delta C + C)}{C \Delta C}}\right) + n^2 L^2 \omega^2} \quad (14)$$

When the frequency ω is expressed by Eq. (7), the impedance Z is expressed by Eq. (15).

$$|Z| = \sqrt{\frac{(n \cdot \Delta C + C)^2}{C^2 \Delta C^2} \cdot L \cdot C + \left(\frac{(R + n \cdot r)^2 - 2 \cdot n \cdot}{\frac{L(n \cdot \Delta C + C)}{C \Delta C}}\right) + \frac{n^2 L^2}{L \cdot C}} \quad (15)$$

$$= \sqrt{(R + n \cdot r)^2 + \frac{L \cdot C}{\Delta C^2}}$$

Here, because the impedance Z in the case where the capacitor ΔC does not exist is expressed by Eq. (11), it is found that the effect of the number of stages of the inductor L and capacitor C is relatively small in Eq. (15).

Figure 50A:
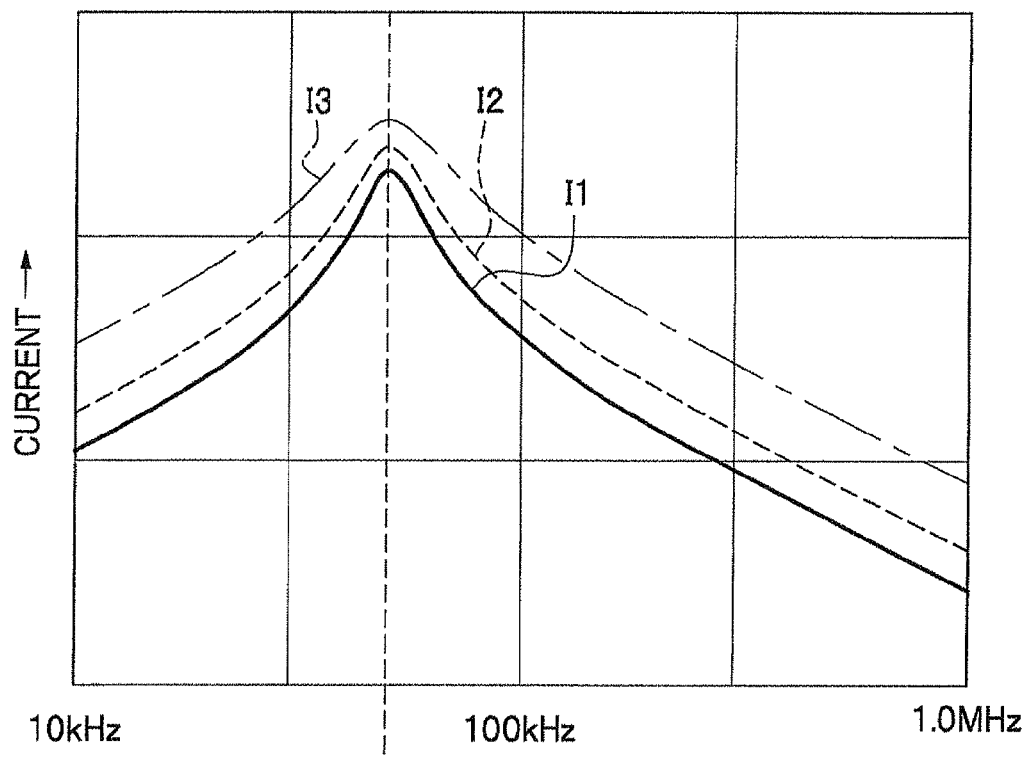
FIG. 50A shows frequency characteristics of a current gain in the case where the capacitor $\Delta C$ is not added.
Figure 50B:
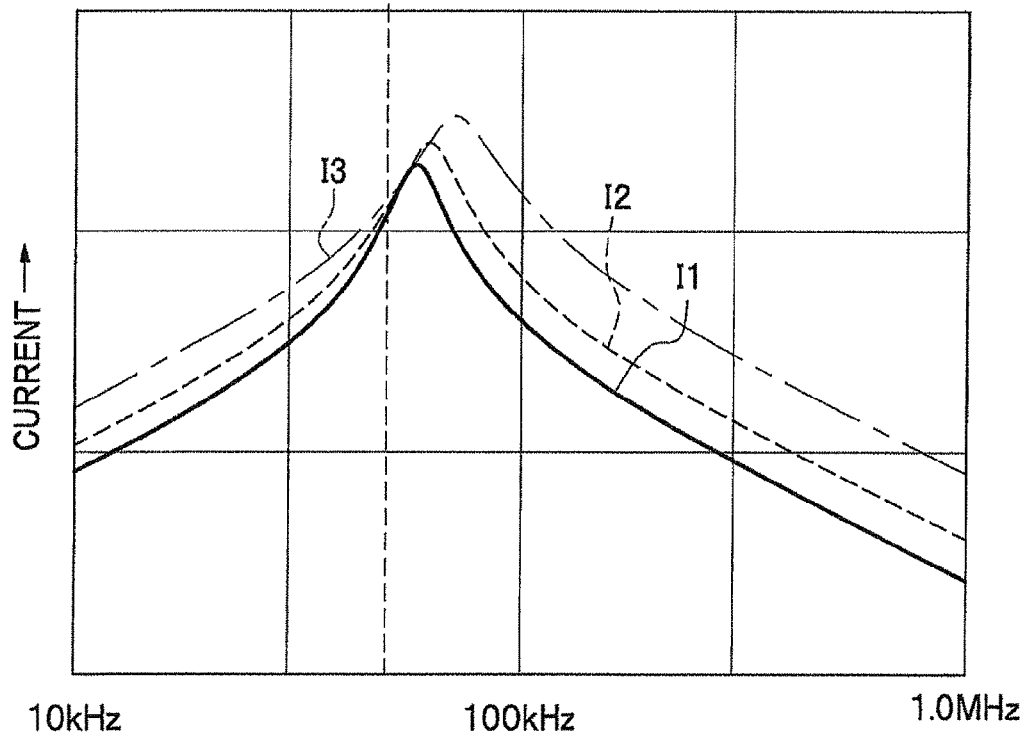
FIG. 50B shows frequency characteristics of a current gain in the case where the capacitor $\Delta C$ is added.

FIG. 50A shows frequency characteristics of a current gain in the case where the capacitor ΔC is not added, and FIG. 50B shows frequency characteristics of a current gain in the case where the capacitor ΔC is added, where the horizontal axis represents a frequency and the vertical axis represents a current gain in both cases. That is, FIG. 50A shows the frequency characteristics of LC equivalent circuits which lack the capacitor ΔC as shown in FIG. 25, FIG. 26, and FIG. 27 (i.e., frequency characteristics shown in FIG. 28), and FIG. 50B shows the frequency characteristics of LC equivalent circuits which include the capacitor ΔC as shown in FIG. 42, FIG. 43, and FIG. 44 (i.e., frequency characteristics shown in FIG. 45). In addition, FIGS. 50A and 50B show the frequency characteristics in the case where the capacitor ΔC whose value is 1 μF, which is the same as those of the C1-C6, is added to the equivalent circuits shown in FIG. 25, FIG. 26, and FIG. 27, and compare the frequency characteristics of the LC equivalent circuit (i.e., frequency characteristics shown in FIG. 28) in the case where the capacitor ΔC does not exist.

That is, as shown in the frequency characteristics shown in FIG. 50A, when the capacitor ΔC does not exist, peak values of the charging currents of the equivalent circuits differ from one another in the vicinity of the resonance frequency (50.35 kHz). However, as shown in the frequency characteristics shown in FIG. 50B, when the capacitor ΔC exists, the values of the charging currents of the equivalent circuits approximate one another in the vicinity of the resonance frequency (50.35 kHz) in the case where the capacitor ΔC does not exist. That is, as will be appreciated from the frequency characteristics shown in FIG. 50B, by adding the capacitor ΔC, the difference between the charging currents caused by the different number of stages becomes small in the vicinity of the resonance frequency (50.35 kHz) in the case where the capacitor ΔC does not exist as shown in the frequency characteristics shown in FIG. 50A. Also, the amount of the charging current is suppressed compared to the amount at the time before the capacitor ΔC is added.

For this reason, in the case where the voltage-doubler rectifying circuit is used, the excessive charging current can be suppressed by adding the capacitor ΔC without increasing the resistance value inserted into the LC circuit in series and the power loss.

That is, in the power supplying apparatus of the tenth embodiment, the AC generating circuit generates an alternating current having a frequency which approximates to the resonance frequency of the series LC circuit, and an capacitor is inserted between the AC generating circuit and the AC circuit. As a result, even if the voltage-doubler rectifying circuit is used, the excessive charging current can be suppressed. Also, the excessive charging current can be suppressed even if the capacitor is inserted between the AC circuit and the rectifying circuit.

Eleventh Embodiment

In an eleventh embodiment, a power supplying apparatus which is able to supply power having an appropriate voltage is to a plurality of circuit modules (loads) will be explained. That is, the power supplying apparatus of the present invention is applied to not only the use to uniform the voltages of the cell modules by performing charging/discharging between the cell modules as described from the second embodiment to the sixth embodiment, but also other use to supply power from other power source to the plurality of circuit modules (loads). For example, there are cases where power is supplied to a plurality of measuring circuits (loads) to measure voltages of the plurality of cell modules, and where power is supplied to a plurality of voltage measuring apparatuses (loads) to measure voltages of the plurality of cell modules, etc.

That is, the capacitors and the inductor are placed so that products of equivalent capacitances and equivalent inductances between the AC generating circuit and each of the rectifying circuits which are pre-stages of the circuit modules are equal to one another. Because resonance frequencies of current supplying system are the same, uniform power can be supplied to each of the circuit modules.

Figure 51:
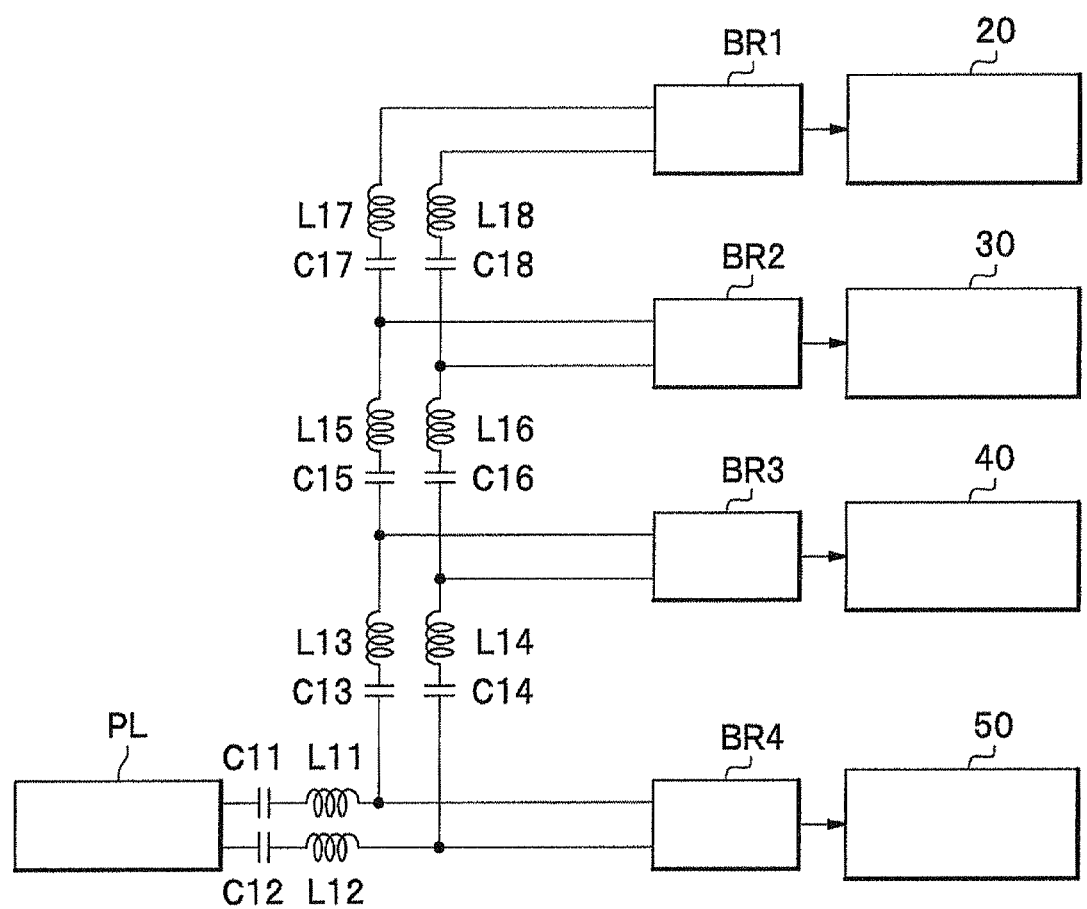
FIG. 51 shows a block diagram showing a first example of a power supplying apparatus in accordance with an eleventh embodiment.
Figure 52:
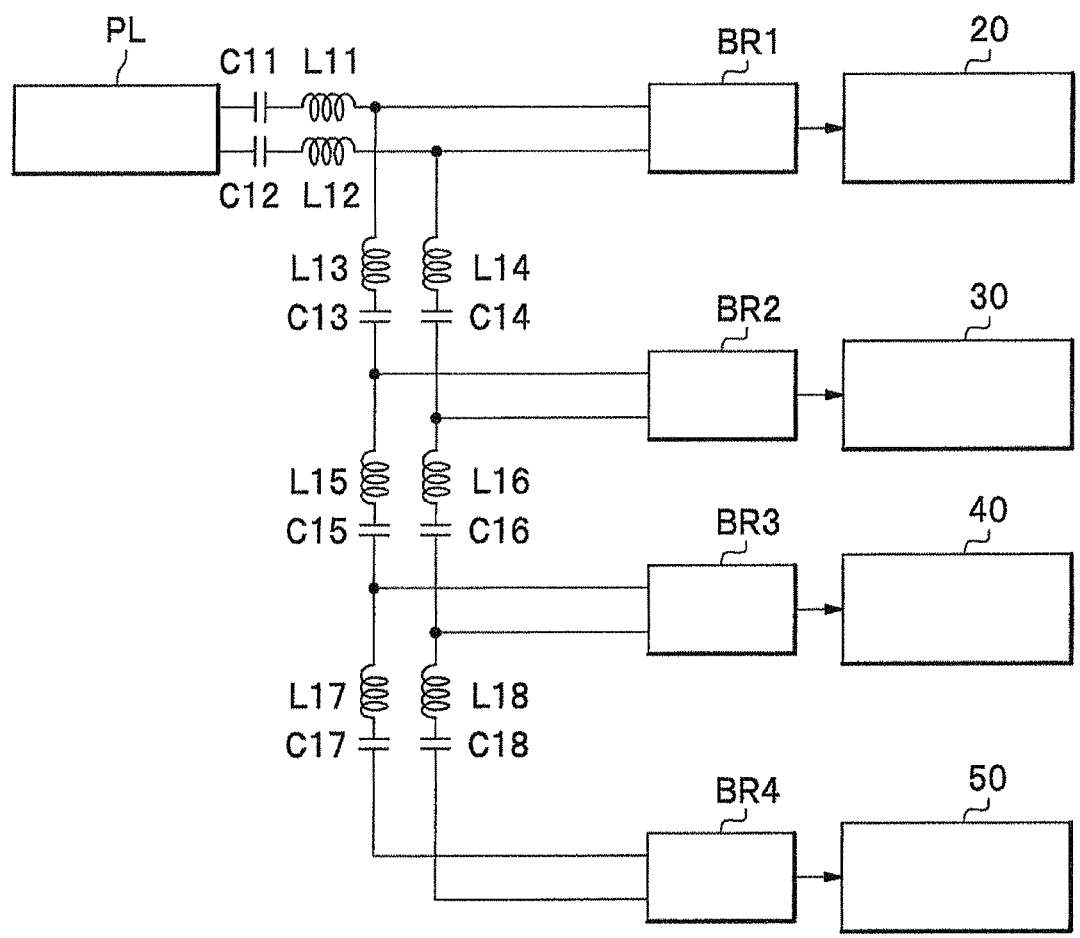
FIG. 52 shows a block diagram showing a second example of the power supplying apparatus in accordance with the eleventh embodiment.
Figure 53:
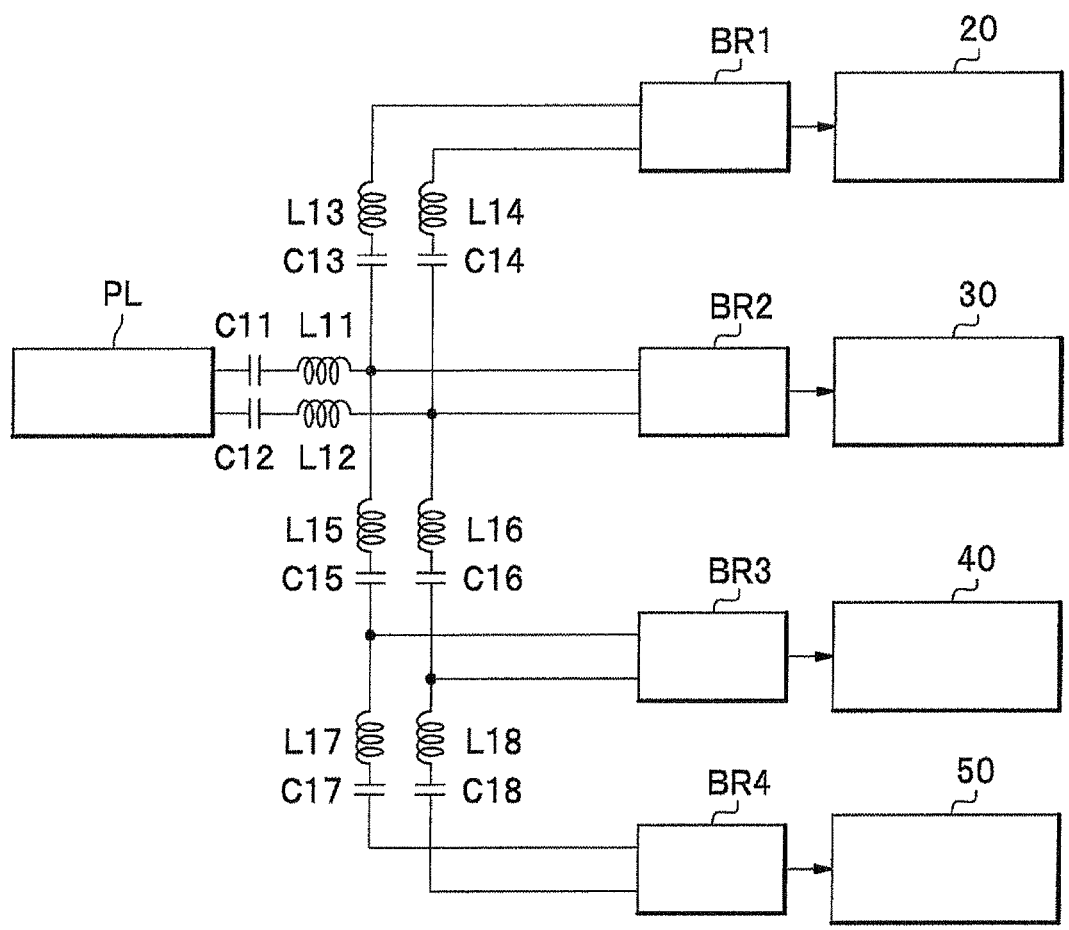
FIG. 53 shows a block diagram showing a third example of the power supplying apparatus in accordance with the eleventh embodiment.
Figure 54:
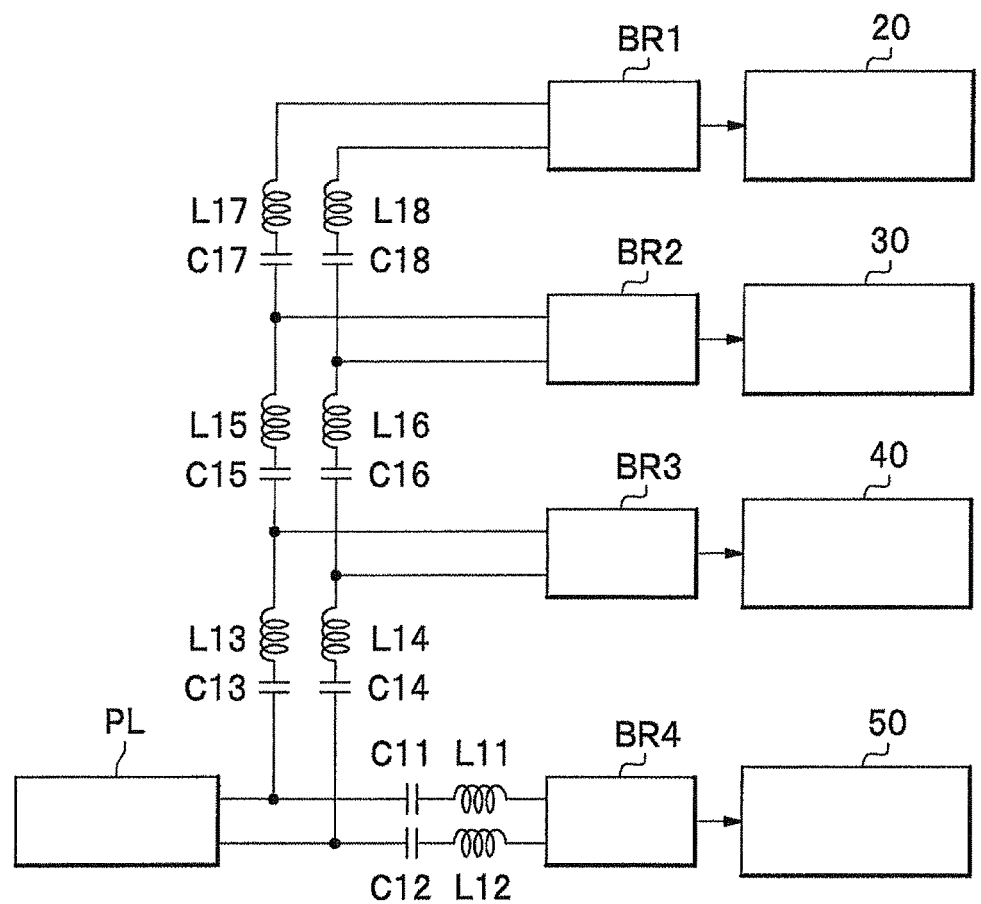
FIG. 54 shows a block diagram showing a fourth example of the power supplying apparatus in accordance with the eleventh embodiment.
Figure 55:
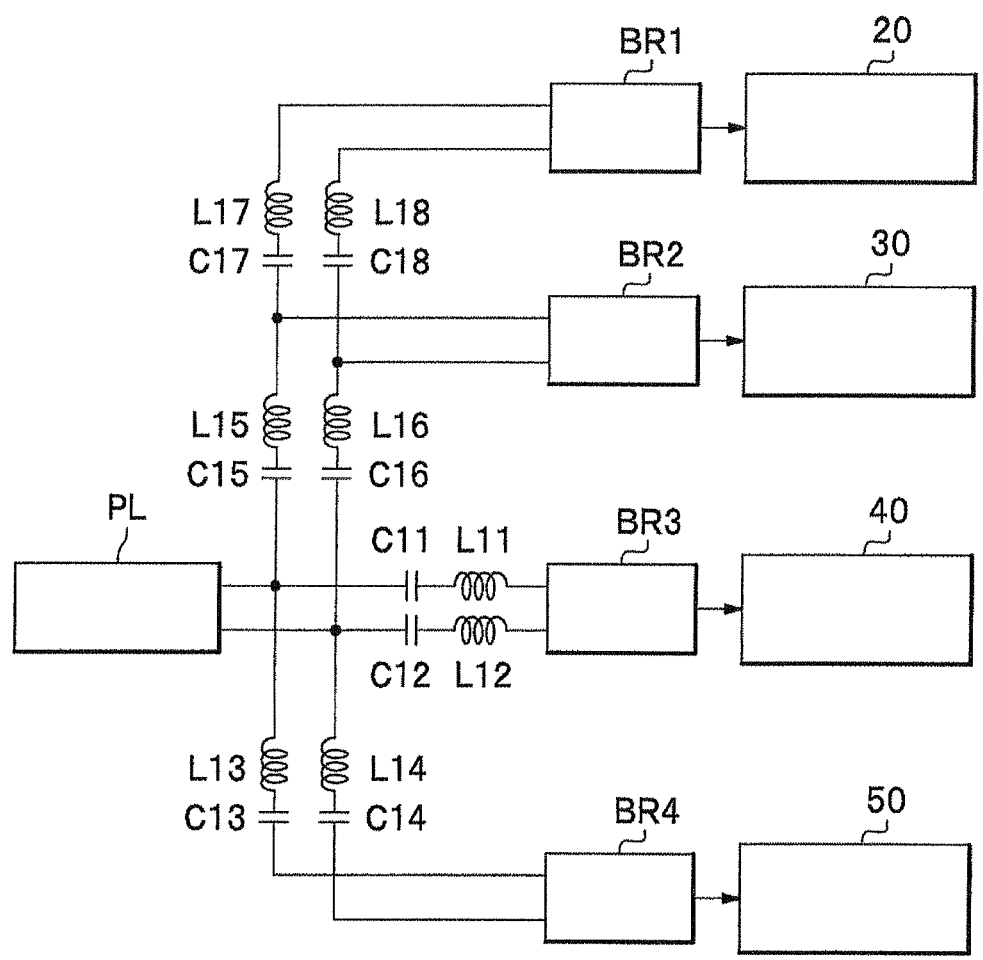
FIG. 55 shows a block diagram showing a fifth example of the power supplying apparatus in accordance with the eleventh embodiment.
Figure 56:
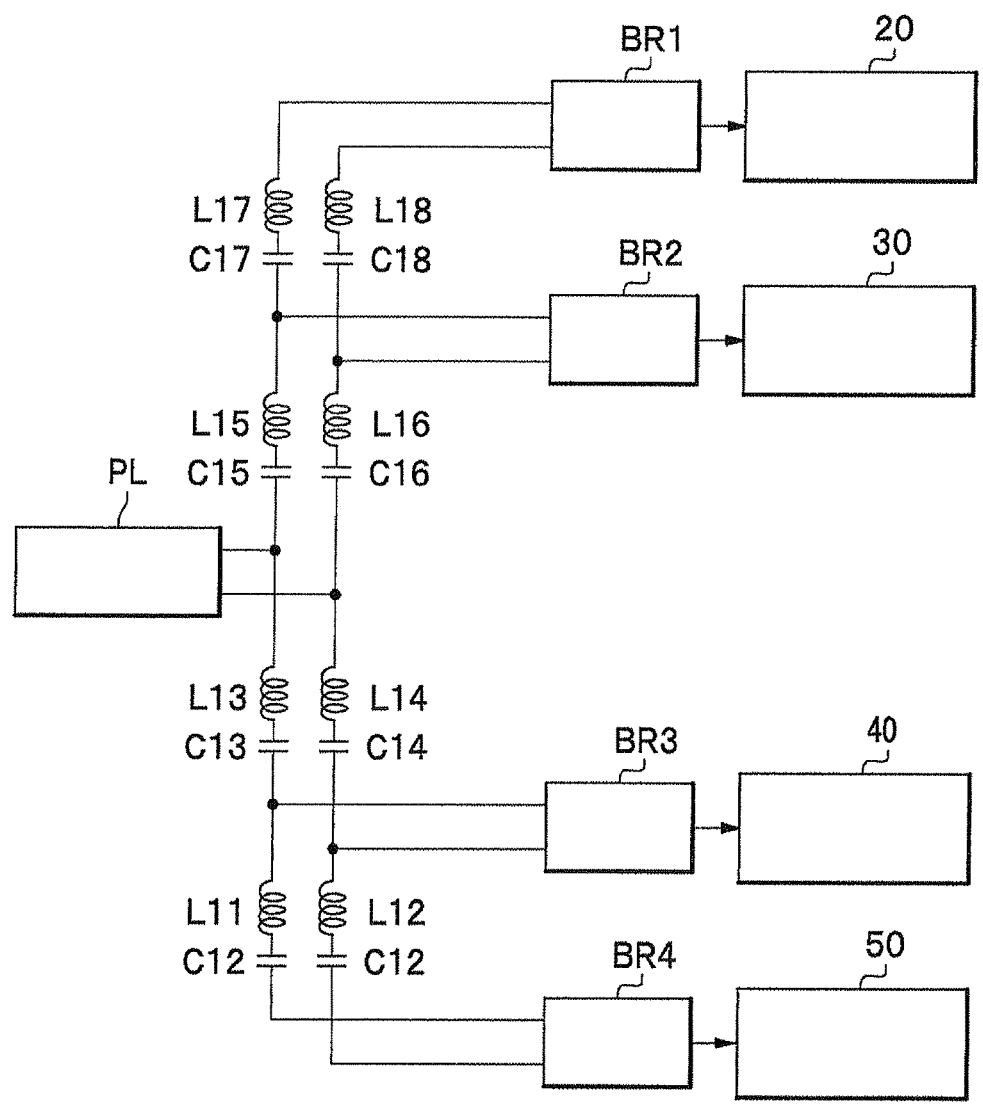
FIG. 56 shows a block diagram showing a sixth example of the power supplying apparatus in accordance with the eleventh embodiment.

FIG. 51 shows a block diagram showing a first example of a power supplying apparatus in accordance with an eleventh embodiment, and FIG. 52 shows a block diagram showing a second example of the power supplying apparatus in accordance with the eleventh embodiment. Also, FIG. 53 shows a block diagram showing a third example of the power supplying apparatus in accordance with the eleventh embodiment, and FIG. 54 shows a block diagram showing a fourth example of the power supplying apparatus in accordance with the eleventh embodiment. Further, FIG. 55 shows a block diagram showing a fifth example of the power supplying apparatus in accordance with the eleventh embodiment, and FIG. 56 shows a block diagram showing a sixth example of the power supplying apparatus in accordance with the eleventh embodiment.

For example, a configuration of the power supplying apparatus shown in FIG. 51 will be explained. The AC generating circuit PL is connected to the rectifying circuits BR1, BR2, BR3, and BR4 in parallel via the series LC circuits, and the rectifying circuits BR1, BR2, BR3, and BR4 are connected to circuit modules 20, 30, 40, and 50 respectively. At this time, in power supplying systems to the circuit modules 20, 30, 40, and 50, the capacitors C and the inductors L are placed so that products of equivalent capacitances and equivalent inductances are equal to one another.

With such configuration, when power is supplied from a power source (not shown) to the AC generating circuit PL, uniform currents (power) are supplied from the rectifying circuits BR1, BR2, BR3, and BR4 to the circuit modules 20, 30, 40, and 50 respectively via the capacitors C and the inductors L where the products of the equivalent capacitances and the equivalent inductances are equal to one another. That is, because the products of the equivalent capacitance and the equivalent inductance in the current supplying systems are equal to one another, uniform current can be supplied to the circuit modules 20, 30, 40, and 50 at the same resonance frequency.

Also, if the capacitors C and the inductors L are placed so that the products of the equivalent capacitances and the equivalent inductances to the rectifying circuits BR1, BR2, BR3, and BR4 differ from one another, desired currents (i.e., currents which differ from one another) can be supplied to the circuit modules 20, 30, 40, and 50 respectively.

In addition, when the series resistance component of the LC is not negligible, the effect of the series resistance component r can be reduced by adding the capacitor ΔC or the inductor ΔL as described from the eighth embodiment to the tenth embodiment.

Also, in the power supplying apparatuses of circuitries shown in FIGS. 52-56, like the power supplying apparatus shown in FIG. 51, uniform currents can be supplied to the circuit modules 20, 30, 40, and 50 respectively at the same resonance frequency by setting the products of the equivalent capacitances and the equivalent inductances in the current supplying systems to the same value. Also, different currents can be supplied to the circuit modules 20, 30, 40, and 50 respectively at different resonance frequencies. In addition, needless to say, not limited to the circuits of these examples, when the capacitors C and the inductors L are placed so that the products of the equivalent capacitances and the equivalent inductances in the current supplying systems are equal to one another, uniform currents can be supplied to the circuit modules 20, 30, 40, and 50 respectively at the same resonance frequency.

What is claimed is:

1. A power supplying apparatus for supplying power to a plurality of loads connected in series, comprising:
a plurality of rectifying circuits connected to the plurality of loads respectively;
one or more AC circuits sequentially connected with the adjacent rectifying circuits;
a plurality of AC generating circuits to apply AC voltages to the respective AC circuits; and
switch elements connected between the loads and the rectifying circuits, the switch elements being configured to open and close for selecting the loads to be power supplied from the plurality of loads; wherein
the plurality of cell modules are charged;
each of the AC circuits comprises a capacitor and an inductor connected in series, and the power supplying apparatus is connected to an assembled battery comprising a plurality of cell modules connected in series, the plurality of cell modules being portions of the plurality of loads;
the plurality of rectifying circuits have first and second controlling terminals on an AC side and positive and negative terminals on a DC side, convert alternating currents input from the first and second controlling terminals into direct currents, and supply the direct currents to the plurality of loads via the positive and negative terminals respectively;
the first controlling terminals are connected each other via the AC circuits so as to transmit the alternating current having a first-phase, and the second controlling terminals are connected with each other via the AC circuits so as to transmit the alternating current having a second-phase; and
the plurality of AC generating circuits have positive electrode input terminals and negative electrode input terminals on the DC side and two AC output terminals on the AC side respectively, convert the direct currents input from the positive and negative electrode input terminals into alternating currents respectively, and apply the AC voltages to the AC circuits via the two AC output terminals respectively.

2. The power supplying apparatus of claim 1, wherein:
products of the equivalent capacitances of the plurality of capacitors connected in series from the AC generating circuits to the respective rectifying circuits and the equivalent inductances of the plurality of inductors from the AC generating circuits to the respective rectifying circuits are set to be the same in any combination of the loads.

3. The power supplying apparatus of claim 1, wherein:
the AC circuits are configured to transmit two or more phases alternating currents.

4. The power supplying apparatus of claim 1, wherein:
the AC generating circuits generate AC voltages having frequencies which are approximate to resonance frequencies of the series circuits of the capacitors and the inductors.

5. The power supplying apparatus of claim 1, wherein:
when AC voltages having frequencies which are approximate to the resonance frequencies of the series circuits of the capacitors and the inductors are generated by the AC generating circuits and the amplitudes of input voltages of the respective rectifying circuits have deviations, the AC generating circuits adjust the frequencies of the generated AC voltages to keep the amplitudes of the input voltages constant.

6. The power supplying apparatus of claim 1, further comprising a first capacitor connected between the AC generating circuit and the AC circuit.

7. The power supplying apparatus of claim 1, further comprising a second capacitor connected between the rectifying circuit and the AC circuit.

8. The power supplying apparatus of claim 1, wherein the switch elements connect the cell modules and the rectifying circuits,
wherein the AC generating circuits are connected to the plurality of cell modules, so as to use the plurality of cell modules as power sources to generate AC voltages; and
the AC generating circuits are operated to discharge the connected cell modules, meanwhile the switch elements of other cell modules are closed so that DC voltages output from the rectifying circuits are applied to the connected cell modules connected thereto.

9. A power supplying apparatus for supplying power to a plurality of loads, comprising:
rectifying circuits connected to the plurality of loads respectively;
AC circuits to sequentially connect between the rectifying circuits; and
AC generating circuits to apply AC voltages to the AC circuits,
wherein the AC circuits comprise capacitors connected in series, frequencies of AC voltages generated by the AC generating circuits are variable in accordance with the transfer characteristics of the AC circuits formed between the AC generating circuits and the selected rectifying circuits.

10. A power supplying apparatus for independently adjusting charged amounts of cell modules of an assembled battery in which the cell modules composed of at least one cell are connected in series, comprising:
a plurality of control modules connected to positive and negative electrodes of the cell modules;
wherein each of the control modules comprises:

a positive terminal and a negative terminal connected to each of the cell modules;

an AC generating circuit which is connected to the positive terminal and the negative terminal and generates an AC voltage by using the cell module as a power source;

a rectifying circuit to rectify the AC voltage;

a control terminal which connects the output side of the AC generating circuit to the input side of the rectifying circuit and to which the AC voltage is applied; and a switch element to connect or disconnect between at least one of the positive terminal and the negative terminal and the output terminal of the rectifying circuit;

wherein capacitors are connected between the control terminals of the adjacent control modules, and the AC generating circuit in any one of the control modules is operated to discharge cell modules connected to the control modules, meanwhile the switch elements in other control modules are closed so that DC voltages output from the rectifying circuits of the other control modules are applied to the cell modules connected to the other control modules.

11. The power supplying apparatus of claim 10, wherein:

the rectifying circuit outputs a DC voltage greater than the peak-to-peak value of its input AC voltage.

12. The power supplying apparatus of claim 10, wherein:

the AC generating circuit generates an AC voltage having a peak-to-peak value greater than the value of the applied DC voltage.

13. The power supplying apparatus of claim 10, wherein:

the AC generating circuit generates a further AC voltage having phase inverted relative to the phase of the AC voltage;

each of the control modules controls connected terminals to output the further AC voltage;

the rectifying circuit performs full-wave rectification on the voltages applied on the control terminals and the further control terminals;

further capacitors are connected between the further control terminals of the adjacent control modules.

14. The power supplying apparatus of claim 10, wherein:

the AC generating circuit generates m-phase AC voltages;

the control module further comprises m−1 control terminals to output the m-phase AC voltages together with the control terminal;

the rectifying circuit performs m-phase full-wave rectification on the m-phase voltages applied on the m control terminals;

m capacitors are connected between the m control terminals of the adjacent control modules.

15. The power supplying apparatus of claim 10, wherein:

the AC voltage generating circuit generates AC voltages having rectangular waveforms.

16. The power supplying apparatus of claim 10, wherein:

communication clock signals for performing serial communication between the control modules are supplied in a manner that the respective control modules are concatenated;

the communication clock signals function as the oscillating sources of the AC generating circuits.

17. The power supplying apparatus of claim 10, wherein:

communication clock signals for indicating the states of the control modules are supplied in a manner that the respective control modules are concatenated;

the communication clock signals function as the oscillating sources of the AC generating circuits.

* * * * *